United States Patent
Wolff et al.

(10) Patent No.: US 12,330,691 B2
(45) Date of Patent: Jun. 17, 2025

(54) MOTION PREDICTION IN AN AUTONOMOUS VEHICLE USING FUSED SYNTHETIC AND CAMERA IMAGES

(71) Applicant: Motional AD LLC, Boston, MA (US)

(72) Inventors: Eric McKenzie Wolff, Zephyr Cove, NV (US); Oscar Beijbom, Santa Cruz, CA (US); Alex Lang, Culver City, CA (US); Sourabh Vora, Marina del Rey, CA (US); Bassam Helou, Santa Monica, CA (US); Elena Corina Grigore, Redwood City, CA (US); Cheng Jiang, West Bloomfield, MI (US)

(73) Assignee: Motional AD LLC

( * ) Notice: Subject to any disclaimer, the term of this patent is extended or adjusted under 35 U.S.C. 154(b) by 287 days.

(21) Appl. No.: 17/806,707

(22) Filed: Jun. 13, 2022

(65) Prior Publication Data
US 2023/0382427 A1 Nov. 30, 2023

Related U.S. Application Data

(60) Provisional application No. 63/365,590, filed on May 31, 2022.

(51) Int. Cl.
*B60W 60/00* (2020.01)
*G06N 3/045* (2023.01)
*G06N 3/08* (2023.01)

(52) U.S. Cl.
CPC ......... *B60W 60/0027* (2020.02); *G06N 3/045* (2023.01); *G06N 3/08* (2013.01);
(Continued)

(58) Field of Classification Search
CPC ......... B60W 60/0027; B60W 2556/45; B60W 2554/404; B60W 2554/80;
(Continued)

(56) References Cited

U.S. PATENT DOCUMENTS 11,292,462 B1 * 4/2022 Karasev .............. G05D 1/0221
11,460,850 B1 * 10/2022 Karasev .............. G05D 1/0088
(Continued)

FOREIGN PATENT DOCUMENTS

EP 2482557 B1 * 3/2020 .............. B60R 1/00

OTHER PUBLICATIONS

Great Britain Office Action issued for Application No. GB 2219821.2, dated Jul. 5, 2023.
(Continued)

*Primary Examiner* — Justin S Lee
(74) *Attorney, Agent, or Firm* — Knobbe, Martens, Olson & Bear, LLP

(57) ABSTRACT

Provided are methods for motion prediction in an autonomous vehicle using fused synthetic and camera images. The method can include obtaining data pairs, each of which reflects data corresponding to a synthetic image representing a birds-eye-view of an area around a vehicle and identifying an object, and data corresponding to a camera image depicting the object. A machine learning model can be trained based on the data pairs to result in a trained model that predicts motion of the object within the data pair based on the synthetic image and camera image in the data pair. Systems and computer program products are also provided.

20 Claims, 14 Drawing Sheets

(52) U.S. Cl.
CPC . *B60W 2420/403* (2013.01); *B60W 2420/408* (2024.01); *B60W 2554/404* (2020.02); *B60W 2554/80* (2020.02); *B60W 2556/45* (2020.02)

(58) Field of Classification Search
CPC ...... B60W 2420/408; B60W 2420/403; G06N 3/045; G06N 3/08
See application file for complete search history.

(56) References Cited

U.S. PATENT DOCUMENTS

| | | | | |
|---|---|---|---|---|
| 12,007,728 | B1* | 6/2024 | Mohta | G06F 18/25 |
| 2010/0246901 | A1* | 9/2010 | Yang | B60R 1/26 |
| | | | | 382/154 |
| 2015/0042799 | A1* | 2/2015 | Zhang | G06V 20/58 |
| | | | | 348/148 |
| 2018/0157916 | A1* | 6/2018 | Doumbouya | G06V 40/103 |
| 2019/0250622 | A1* | 8/2019 | Nister | G06V 20/584 |
| 2019/0382007 | A1 | 12/2019 | Casas et al. | |
| 2020/0202706 | A1* | 6/2020 | Chaves | G08G 1/166 |
| 2020/0218979 | A1* | 7/2020 | Kwon | G06N 3/08 |
| 2021/0302992 | A1* | 9/2021 | Chen | G06N 3/045 |
| 2021/0312725 | A1* | 10/2021 | Milton | G07C 5/008 |
| 2022/0198937 | A1* | 6/2022 | Mericli | G05D 1/69 |
| 2023/0177391 | A1* | 6/2023 | Packwood | G06V 20/52 |
| | | | | 706/12 |
| 2024/0104913 | A1* | 3/2024 | Redford | G06N 3/045 |

OTHER PUBLICATIONS

Great Britain Office Action (Preliminary Examination) issued for Application No. GB 2219821.2, dated Jul. 5, 2023.

SAE On-Road Automated Vehicle Standards Committee, "SAE International's Standard J3016: Taxonomy and Definitions for Terms Related to Driving Automation Systems for On-Road Motor Vehicles", Jun. 2018, in 35 pages.

German Formalities Office Action issued for Application No. DE 102022134446.0, dated Aug. 18, 2023.

Great Britain Office Action (Preliminary Examination) issued for Application No. GB 2414735.7, dated Oct. 10, 2024.

* cited by examiner

MOTION PREDICTION IN AN AUTONOMOUS VEHICLE USING FUSED SYNTHETIC AND CAMERA IMAGES

DETAILED DESCRIPTION

Figure 1:
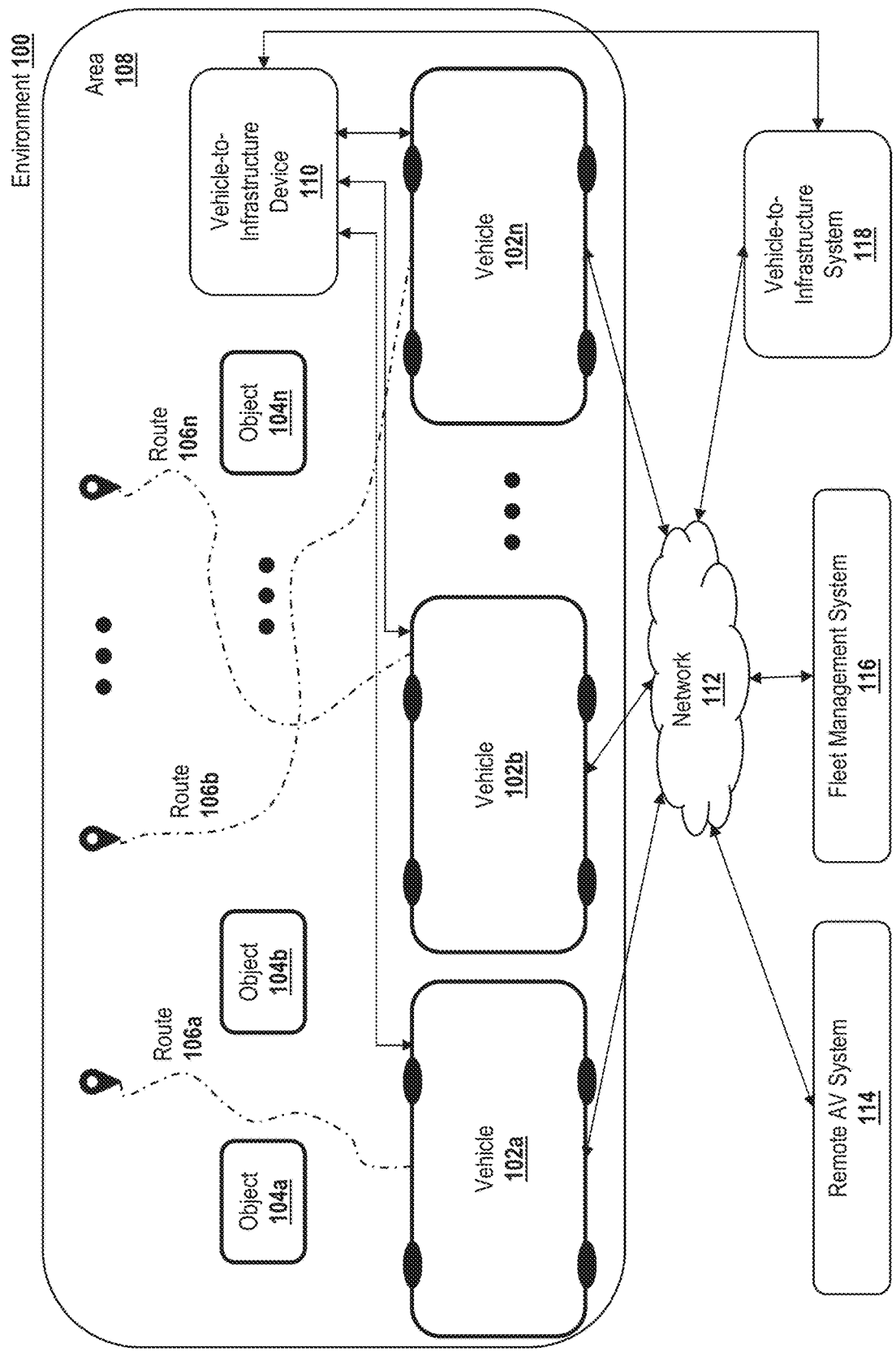
FIG. 1 is an example environment in which a vehicle including one or more components of an autonomous system can be implemented.

In the following description numerous specific details are set forth in order to provide a thorough understanding of the present disclosure for the purposes of explanation. It will be apparent, however, that the embodiments described by the present disclosure can be practiced without these specific details. In some instances, well-known structures and devices are illustrated in block diagram form in order to avoid unnecessarily obscuring aspects of the present disclosure.

Specific arrangements or orderings of schematic elements, such as those representing systems, devices, modules, instruction blocks, data elements, and/or the like are illustrated in the drawings for ease of description. However, it will be understood by those skilled in the art that the specific ordering or arrangement of the schematic elements in the drawings is not meant to imply that a particular order or sequence of processing, or separation of processes, is required unless explicitly described as such. Further, the inclusion of a schematic element in a drawing is not meant to imply that such element is required in all embodiments or that the features represented by such element may not be included in or combined with other elements in some embodiments unless explicitly described as such.

Further, where connecting elements such as solid or dashed lines or arrows are used in the drawings to illustrate a connection, relationship, or association between or among two or more other schematic elements, the absence of any such connecting elements is not meant to imply that no connection, relationship, or association can exist. In other words, some connections, relationships, or associations between elements are not illustrated in the drawings so as not to obscure the disclosure. In addition, for ease of illustration, a single connecting element can be used to represent multiple connections, relationships or associations between elements. For example, where a connecting element represents communication of signals, data, or instructions (e.g., "software instructions"), it should be understood by those skilled in the art that such element can represent one or multiple signal paths (e.g., a bus), as may be needed, to affect the communication.

Although the terms first, second, third, and/or the like are used to describe various elements, these elements should not be limited by these terms. The terms first, second, third, and/or the like are used only to distinguish one element from another. For example, a first contact could be termed a second contact and, similarly, a second contact could be termed a first contact without departing from the scope of the described embodiments. The first contact and the second contact are both contacts, but they are not the same contact.

The terminology used in the description of the various described embodiments herein is included for the purpose of describing particular embodiments only and is not intended to be limiting. As used in the description of the various described embodiments and the appended claims, the singular forms "a," "an" and "the" are intended to include the plural forms as well and can be used interchangeably with "one or more" or "at least one," unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description specify the presence of stated features, integers, steps, operations, elements, and/or components, but do not preclude the presence or addition of one or more other features, integers, steps, operations, elements, components, and/or groups thereof.

As used herein, the terms "communication" and "communicate" refer to at least one of the reception, receipt, transmission, transfer, provision, and/or the like of information (or information represented by, for example, data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and transmits the processed information to the second unit. In some embodiments, a message may refer to a network packet (e.g., a data packet and/or the like) that includes data.

As used herein, the term "if" is, optionally, construed to mean "when", "upon", "in response to determining," "in response to detecting," and/or the like, depending on the context. Similarly, the phrase "if it is determined" or "if [a stated condition or event] is detected" is, optionally, construed to mean "upon determining," "in response to determining," "upon detecting [the stated condition or event]," "in response to detecting [the stated condition or event]," and/or the like, depending on the context. Also, as used herein, the terms "has", "have", "having", or the like are intended to be open-ended terms. Further, the phrase "based on" is intended to mean "based at least partially on" unless explicitly stated otherwise.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments can be practiced without these specific details. In other instances, well-known methods, procedures, components, circuits, and networks have not been described in detail so as not to unnecessarily obscure aspects of the embodiments.

General Overview

In some aspects and/or embodiments, systems, methods, and computer program products described herein include and/or implement fusion of camera images with the output of a perception system of an autonomous vehicle for purposes such as planning or motion prediction. Often, autonomous vehicles have a variety of sensor modalities—such as cameras, lidar, radar, or the like—used to try to perceive their environment. These perceptions are then used as inputs to other systems, such as planning systems, to control operation of the vehicle. As such, accurate perception of a vehicle's environment can be critically important in ensuring safe and effective vehicle operation. However, combining the various available sensor modalities into accurate and useful perceptual understanding is often challenging. In practice, it often occurs that one modality is preferable to others, or even a combination of others. For example, one mechanism for providing contextual understanding of an environment is to produce a birds-eye-view (BEV) synthetic image of an area around a vehicle, which models for example the vehicle and objects around the vehicle from a view directly above the vehicle. When producing such a BEV synthetic image, it often occurs that using one modality alone, such as lidar, produces more accurate results than attempting to combine multiple modalities. This may occur, for example, due to increased accuracy of the one modality or difficult in projecting data from other modalities into the relevant view. However, this modality may not capture important context that most humans intuitively understand to be important for accurate vehicle operation. For example, lidar alone may not capture important signals such as the presence (or absence) of brake lights or turn signals on another vehicle, which can indicate likely motion of the other vehicle and thus represent important data for planning actions of an autonomous vehicle. Thus, autonomous vehicles are often left to decide between decreased accuracy caused by inclusion of multiple sensor modalities when perceiving their environment, or loss of context due to limited modalities.

Embodiments of the present disclosure provide a solution to these problems by providing for fusion of output of additional sensor modalities with the output of a perception system, in a manner that provides for capture of context from those additional sensor modalities without interference with the accuracy of the perception system. Specifically, as disclosed herein, a machine learning model may be trained to take as input the output of a perception system, such as a BEV image, and data from the additional sensor modalities, such as camera images. For example, the machine learning model may include one or more convolutional neural networks that take as inputs a synthetic BEV image and a raw camera image. The machine learning model can then output information used for motion prediction or planning. For example, where the BEV image represents an object in the environment of a vehicle (e.g., another vehicle) and the raw camera image depicts the object, the output of the machine learning model can represent the predicted motion of the object. Illustratively, if the object is another vehicle, and the camera image captures that the other vehicle has its brake lights illuminated, the model may output a prediction that the vehicle is likely to be stopping. In this way, the data captured within the BEV image may be supplemented with the data from the additional sensor modality. Because the data from the additional sensor modality is combined with an output of a perception system, like a BEV image, subsequent to generation, the data of the additional sensor modality does not interfere with perception system as it may if introduced to generate the initial output of the perception system. Accordingly, these embodiments enable context from the additional sensor modalities to be captured in a manner that overcomes challenges with naïve inclusion of data of the additional sensor modalities in a perception system.

In addition to motion prediction for objects, embodiments of the present disclosure may further provide for action planning at an autonomous vehicle. Illustratively, it may be desirable for a vehicle to operate, as much as possible, in a manner that a skilled human driver would operate. A human driver, in turn, may utilize context that is captured in some but not all sensor modalities, such as brake lights, turn signals, etc. Thus, embodiments of the present disclosure can include a machine learning model that utilizes a combination of perception system output (e.g., a synthetic BEV image) and data of additional sensor modalities to provide planned actions of the vehicle, in addition to or alternatively to motion prediction for perceived objects.

As will be appreciated by one of skill in the art in light of the present disclosure, the embodiments disclosed herein improve the ability of computing systems, such as computing devices included within or supporting operation of self-driving vehicles, to conduct objection motion prediction or vehicle planning. Moreover, the presently disclosed embodiments address technical problems inherent within computing systems; specifically, the difficulty of combining data of multiple sensor modalities accurately and in a manner that captures the various contextual information available across such modalities. These technical problems are addressed by the various technical solutions described herein, including the use of a machine learning model trained to combine the output of a perception system, such as a synthetic BEV image, with data of additional sensor modalities, such as camera images, to result in prediction object motion or planned actions. Thus, the present disclosure represents an improvement in computer vision systems and computing systems in general.

The foregoing aspects and many of the attendant advantages of this disclosure will become more readily appreciated as the same become better understood by reference to the following description, when taken in conjunction with the accompanying drawings.

Referring now to FIG. 1, illustrated is example environment 100 in which vehicles that include autonomous systems, as well as vehicles that do not, are operated. As illustrated, environment 100 includes vehicles 102*a*-102*n*, objects 104*a*-104*n*, routes 106*a*-106*n*, area 108, vehicle-to-infrastructure (V2I) device 110, network 112, remote autonomous vehicle (AV) system 114, fleet management system 116, and V2I system 118. Vehicles 102*a*-102*n*, vehicle-to-infrastructure (V2I) device 110, network 112, autonomous vehicle (AV) system 114, fleet management system 116, and V2I system 118 interconnect (e.g., establish a connection to communicate and/or the like) via wired connections, wireless connections, or a combination of wired or wireless connections. In some embodiments, objects 104a-104n interconnect with at least one of vehicles 102a-102n, vehicle-to-infrastructure (V2I) device 110, network 112, autonomous vehicle (AV) system 114, fleet management system 116, and V2I system 118 via wired connections, wireless connections, or a combination of wired or wireless connections.

Vehicles 102a-102n (referred to individually as vehicle 102 and collectively as vehicles 102) include at least one device configured to transport goods and/or people. In some embodiments, vehicles 102 are configured to be in communication with V2I device 110, remote AV system 114, fleet management system 116, and/or V2I system 118 via network 112. In some embodiments, vehicles 102 include cars, buses, trucks, trains, and/or the like. In some embodiments, vehicles 102 are the same as, or similar to, vehicles 200, described herein (see FIG. 2). In some embodiments, a vehicle 200 of a set of vehicles 200 is associated with an autonomous fleet manager. In some embodiments, vehicles 102 travel along respective routes 106a-106n (referred to individually as route 106 and collectively as routes 106), as described herein. In some embodiments, one or more vehicles 102 include an autonomous system (e.g., an autonomous system that is the same as or similar to autonomous system 202).

Objects 104a-104n (referred to individually as object 104 and collectively as objects 104) include, for example, at least one vehicle, at least one pedestrian, at least one cyclist, at least one structure (e.g., a building, a sign, a fire hydrant, etc.), and/or the like. Each object 104 is stationary (e.g., located at a fixed location for a period of time) or mobile (e.g., having a velocity and associated with at least one trajectory). In some embodiments, objects 104 are associated with corresponding locations in area 108.

Routes 106a-106n (referred to individually as route 106 and collectively as routes 106) are each associated with (e.g., prescribe) a sequence of actions (also known as a trajectory) connecting states along which an AV can navigate. Each route 106 starts at an initial state (e.g., a state that corresponds to a first spatiotemporal location, velocity, and/or the like) and ends at a final goal state (e.g., a state that corresponds to a second spatiotemporal location that is different from the first spatiotemporal location) or goal region (e.g. a subspace of acceptable states (e.g., terminal states)). In some embodiments, the first state includes a location at which an individual or individuals are to be picked-up by the AV and the second state or region includes a location or locations at which the individual or individuals picked-up by the AV are to be dropped-off. In some embodiments, routes 106 include a plurality of acceptable state sequences (e.g., a plurality of spatiotemporal location sequences), the plurality of state sequences associated with (e.g., defining) a plurality of trajectories. In an example, routes 106 include only high level actions or imprecise state locations, such as a series of connected roads dictating turning directions at roadway intersections. Additionally, or alternatively, routes 106 may include more precise actions or states such as, for example, specific target lanes or precise locations within the lane areas and targeted speed at those positions. In an example, routes 106 include a plurality of precise state sequences along the at least one high level action sequence with a limited lookahead horizon to reach intermediate goals, where the combination of successive iterations of limited horizon state sequences cumulatively correspond to a plurality of trajectories that collectively form the high level route to terminate at the final goal state or region.

Area 108 includes a physical area (e.g., a geographic region) within which vehicles 102 can navigate. In an example, area 108 includes at least one state (e.g., a country, a province, an individual state of a plurality of states included in a country, etc.), at least one portion of a state, at least one city, at least one portion of a city, etc. In some embodiments, area 108 includes at least one named thoroughfare (referred to herein as a "road") such as a highway, an interstate highway, a parkway, a city street, etc. Additionally, or alternatively, in some examples area 108 includes at least one unnamed road such as a driveway, a section of a parking lot, a section of a vacant and/or undeveloped lot, a dirt path, etc. In some embodiments, a road includes at least one lane (e.g., a portion of the road that can be traversed by vehicles 102). In an example, a road includes at least one lane associated with (e.g., identified based on) at least one lane marking.

Vehicle-to-Infrastructure (V2I) device 110 (sometimes referred to as a Vehicle-to-Infrastructure or Vehicle-to-Everything (V2X) device) includes at least one device configured to be in communication with vehicles 102 and/or V2I infrastructure system 118. In some embodiments, V2I device 110 is configured to be in communication with vehicles 102, remote AV system 114, fleet management system 116, and/or V2I system 118 via network 112. In some embodiments, V2I device 110 includes a radio frequency identification (RFID) device, signage, cameras (e.g., two-dimensional (2D) and/or three-dimensional (3D) cameras), lane markers, streetlights, parking meters, etc. In some embodiments, V2I device 110 is configured to communicate directly with vehicles 102. Additionally, or alternatively, in some embodiments V2I device 110 is configured to communicate with vehicles 102, remote AV system 114, and/or fleet management system 116 via V2I system 118. In some embodiments, V2I device 110 is configured to communicate with V2I system 118 via network 112.

Network 112 includes one or more wired and/or wireless networks. In an example, network 112 includes a cellular network (e.g., a long term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN), a private network, an ad hoc network, an intranet, the Internet, a fiber optic-based network, a cloud computing network, etc., a combination of some or all of these networks, and/or the like.

Remote AV system 114 includes at least one device configured to be in communication with vehicles 102, V2I device 110, network 112, fleet management system 116, and/or V2I system 118 via network 112. In an example, remote AV system 114 includes a server, a group of servers, and/or other like devices. In some embodiments, remote AV system 114 is co-located with the fleet management system 116. In some embodiments, remote AV system 114 is involved in the installation of some or all of the components of a vehicle, including an autonomous system, an autonomous vehicle compute, software implemented by an autonomous vehicle compute, and/or the like. In some embodiments, remote AV system 114 maintains (e.g., updates and/or replaces) such components and/or software during the lifetime of the vehicle.

Fleet management system 116 includes at least one device configured to be in communication with vehicles 102, V2I device 110, remote AV system 114, and/or V2I infrastructure system 118. In an example, fleet management system 116 includes a server, a group of servers, and/or other like devices. In some embodiments, fleet management system 116 is associated with a ridesharing company (e.g., an organization that controls operation of multiple vehicles (e.g., vehicles that include autonomous systems and/or vehicles that do not include autonomous systems) and/or the like).

In some embodiments, V2I system 118 includes at least one device configured to be in communication with vehicles 102, V2I device 110, remote AV system 114, and/or fleet management system 116 via network 112. In some examples, V2I system 118 is configured to be in communication with V2I device 110 via a connection different from network 112. In some embodiments, V2I system 118 includes a server, a group of servers, and/or other like devices. In some embodiments, V2I system 118 is associated with a municipality or a private institution (e.g., a private institution that maintains V2I device 110 and/or the like).

The number and arrangement of elements illustrated in FIG. 1 are provided as an example. There can be additional elements, fewer elements, different elements, and/or differently arranged elements, than those illustrated in FIG. 1. Additionally, or alternatively, at least one element of environment 100 can perform one or more functions described as being performed by at least one different element of FIG. 1. Additionally, or alternatively, at least one set of elements of environment 100 can perform one or more functions described as being performed by at least one different set of elements of environment 100.

Figure 2:
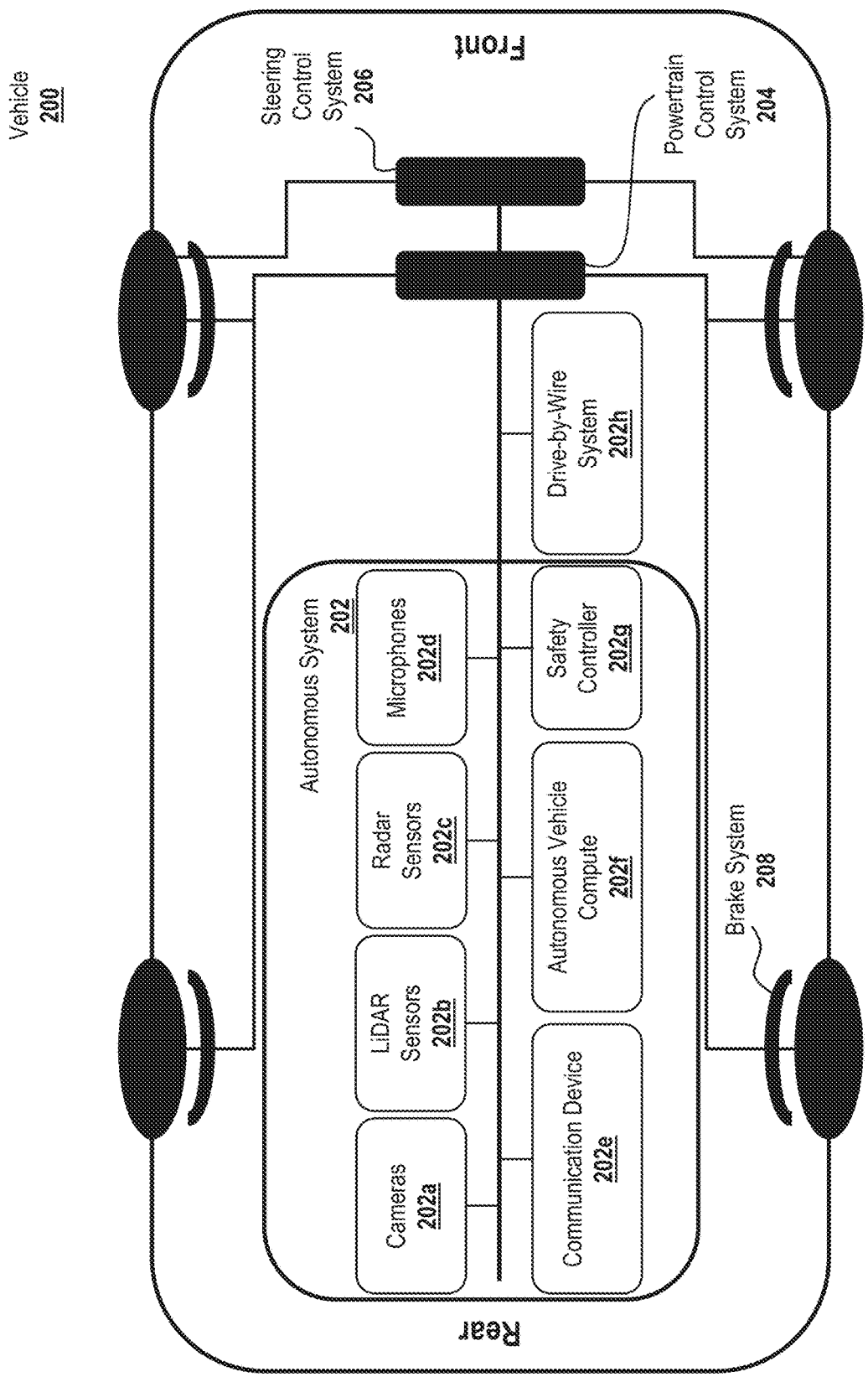
FIG. 2 is a diagram of one or more systems of a vehicle including an autonomous system.

Referring now to FIG. 2, vehicle 200 (which may be the same as, or similar to vehicles 102 of FIG. 1) includes or is associated with autonomous system 202, powertrain control system 204, steering control system 206, and brake system 208. In some embodiments, vehicle 200 is the same as or similar to vehicle 102 (see FIG. 1). In some embodiments, autonomous system 202 is configured to confer vehicle 200 autonomous driving capability (e.g., implement at least one driving automation or maneuver-based function, feature, device, and/or the like that enable vehicle 200 to be partially or fully operated without human intervention including, without limitation, fully autonomous vehicles (e.g., vehicles that forego reliance on human intervention such as Level 5 ADS-operated vehicles), highly autonomous vehicles (e.g., vehicles that forego reliance on human intervention in certain situations such as Level 4 ADS-operated vehicles), conditional autonomous vehicles (e.g., vehicles that forego reliance on human intervention in limited situations such as Level 3 ADS-operated vehicles) and/or the like. In one embodiment, autonomous system 202 includes operational or tactical functionality required to operate vehicle 200 in on-road traffic and perform part or all of Dynamic Driving Task (DDT) on a sustained basis. In another embodiment, autonomous system 202 includes an Advanced Driver Assistance System (ADAS) that includes driver support features. Autonomous system 202 supports various levels of driving automation, ranging from no driving automation (e.g., Level 0) to full driving automation (e.g., Level 5). For a detailed description of fully autonomous vehicles and highly autonomous vehicles, reference may be made to SAE International's standard J3016: Taxonomy and Definitions for Terms Related to On-Road Motor Vehicle Automated Driving Systems, which is incorporated by reference in its entirety. In some embodiments, vehicle 200 is associated with an autonomous fleet manager and/or a ridesharing company.

Autonomous system 202 includes a sensor suite that includes one or more devices such as cameras 202a, LiDAR sensors 202b, radar sensors 202c, and microphones 202d. In some embodiments, autonomous system 202 can include more or fewer devices and/or different devices (e.g., ultrasonic sensors, inertial sensors, GPS receivers (discussed below), odometry sensors that generate data associated with an indication of a distance that vehicle 200 has traveled, and/or the like). In some embodiments, autonomous system 202 uses the one or more devices included in autonomous system 202 to generate data associated with environment 100, described herein. The data generated by the one or more devices of autonomous system 202 can be used by one or more systems described herein to observe the environment (e.g., environment 100) in which vehicle 200 is located. In some embodiments, autonomous system 202 includes communication device 202e, autonomous vehicle compute 202f, drive-by-wire (DBW) system 202h, and safety controller 202g.

Figure 3:
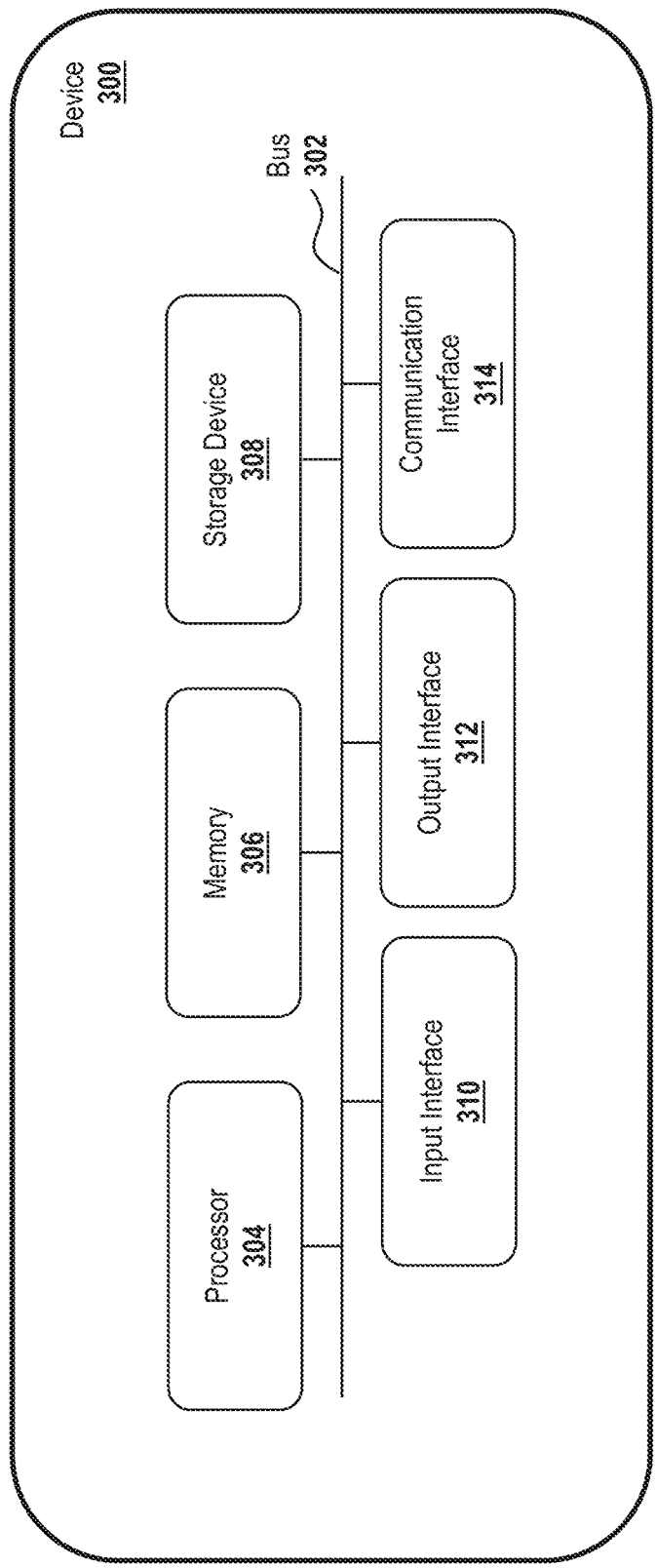
FIG. 3 is a diagram of components of one or more devices and/or one or more systems of FIGS. 1 and 2.

Cameras 202a include at least one device configured to be in communication with communication device 202e, autonomous vehicle compute 202f, and/or safety controller 202g via a bus (e.g., a bus that is the same as or similar to bus 302 of FIG. 3). Cameras 202a include at least one camera (e.g., a digital camera using a light sensor such as a Charge-Coupled Device (CCD), a thermal camera, an infrared (IR) camera, an event camera, and/or the like) to capture images including physical objects (e.g., cars, buses, curbs, people, and/or the like). In some embodiments, camera 202a generates camera data as output. In some examples, camera 202a generates camera data that includes image data associated with an image. In this example, the image data may specify at least one parameter (e.g., image characteristics such as exposure, brightness, etc., an image timestamp, and/or the like) corresponding to the image. In such an example, the image may be in a format (e.g., RAW, JPEG, PNG, and/or the like). In some embodiments, camera 202a includes a plurality of independent cameras configured on (e.g., positioned on) a vehicle to capture images for the purpose of stereopsis (stereo vision). In some examples, camera 202a includes a plurality of cameras that generate image data and transmit the image data to autonomous vehicle compute 202f and/or a fleet management system (e.g., a fleet management system that is the same as or similar to fleet management system 116 of FIG. 1). In such an example, autonomous vehicle compute 202f determines depth to one or more objects in a field of view of at least two cameras of the plurality of cameras based on the image data from the at least two cameras. In some embodiments, cameras 202a is configured to capture images of objects within a distance from cameras 202a (e.g., up to 100 meters, up to a kilometer, and/or the like). Accordingly, cameras 202a include features such as sensors and lenses that are optimized for perceiving objects that are at one or more distances from cameras 202a.

In an embodiment, camera 202a includes at least one camera configured to capture one or more images associated with one or more traffic lights, street signs and/or other physical objects that provide visual navigation information. In some embodiments, camera 202a generates traffic light data associated with one or more images. In some examples, camera 202a generates TLD (Traffic Light Detection) data associated with one or more images that include a format (e.g., RAW, JPEG, PNG, and/or the like). In some embodiments, camera 202a that generates TLD data differs from other systems described herein incorporating cameras in that camera 202a can include one or more cameras with a wide field of view (e.g., a wide-angle lens, a fish-eye lens, a lens having a viewing angle of approximately 120 degrees or more, and/or the like) to generate images about as many physical objects as possible.

Light Detection and Ranging (LiDAR) sensors 202b include at least one device configured to be in communication with communication device 202e, autonomous vehicle compute 202f, and/or safety controller 202g via a bus (e.g., a bus that is the same as or similar to bus 302 of FIG. 3). LiDAR sensors 202b include a system configured to transmit light from a light emitter (e.g., a laser transmitter). Light emitted by LiDAR sensors 202b include light (e.g., infrared light and/or the like) that is outside of the visible spectrum. In some embodiments, during operation, light emitted by LiDAR sensors 202b encounters a physical object (e.g., a vehicle) and is reflected back to LiDAR sensors 202b. In some embodiments, the light emitted by LiDAR sensors 202b does not penetrate the physical objects that the light encounters. LiDAR sensors 202b also include at least one light detector which detects the light that was emitted from the light emitter after the light encounters a physical object. In some embodiments, at least one data processing system associated with LiDAR sensors 202b generates an image (e.g., a point cloud, a combined point cloud, and/or the like) representing the objects included in a field of view of LiDAR sensors 202b. In some examples, the at least one data processing system associated with LiDAR sensor 202b generates an image that represents the boundaries of a physical object, the surfaces (e.g., the topology of the surfaces) of the physical object, and/or the like. In such an example, the image is used to determine the boundaries of physical objects in the field of view of LiDAR sensors 202b.

Radio Detection and Ranging (radar) sensors 202c include at least one device configured to be in communication with communication device 202e, autonomous vehicle compute 202f, and/or safety controller 202g via a bus (e.g., a bus that is the same as or similar to bus 302 of FIG. 3). Radar sensors 202c include a system configured to transmit radio waves (either pulsed or continuously). The radio waves transmitted by radar sensors 202c include radio waves that are within a predetermined spectrum. In some embodiments, during operation, radio waves transmitted by radar sensors 202c encounter a physical object and are reflected back to radar sensors 202c. In some embodiments, the radio waves transmitted by radar sensors 202c are not reflected by some objects. In some embodiments, at least one data processing system associated with radar sensors 202c generates signals representing the objects included in a field of view of radar sensors 202c. For example, the at least one data processing system associated with radar sensor 202c generates an image that represents the boundaries of a physical object, the surfaces (e.g., the topology of the surfaces) of the physical object, and/or the like. In some examples, the image is used to determine the boundaries of physical objects in the field of view of radar sensors 202c.

Microphones 202d includes at least one device configured to be in communication with communication device 202e, autonomous vehicle compute 202f, and/or safety controller 202g via a bus (e.g., a bus that is the same as or similar to bus 302 of FIG. 3). Microphones 202d include one or more microphones (e.g., array microphones, external microphones, and/or the like) that capture audio signals and generate data associated with (e.g., representing) the audio signals. In some examples, microphones 202d include transducer devices and/or like devices. In some embodiments, one or more systems described herein can receive the data generated by microphones 202d and determine a position of an object relative to vehicle 200 (e.g., a distance and/or the like) based on the audio signals associated with the data.

Communication device 202e includes at least one device configured to be in communication with cameras 202a, LiDAR sensors 202b, radar sensors 202c, microphones 202d, autonomous vehicle compute 202f, safety controller 202g, and/or DBW (Drive-By-Wire) system 202h. For example, communication device 202e may include a device that is the same as or similar to communication interface 314 of FIG. 3. In some embodiments, communication device 202e includes a vehicle-to-vehicle (V2V) communication device (e.g., a device that enables wireless communication of data between vehicles).

Autonomous vehicle compute 202f include at least one device configured to be in communication with cameras 202a, LiDAR sensors 202b, radar sensors 202c, microphones 202d, communication device 202e, safety controller 202g, and/or DBW system 202h. In some examples, autonomous vehicle compute 202f includes a device such as a client device, a mobile device (e.g., a cellular telephone, a tablet, and/or the like), a server (e.g., a computing device including one or more central processing units, graphical processing units, and/or the like), and/or the like. In some embodiments, autonomous vehicle compute 202f is the same as or similar to autonomous vehicle compute 400, described herein. Additionally, or alternatively, in some embodiments autonomous vehicle compute 202f is configured to be in communication with an autonomous vehicle system (e.g., an autonomous vehicle system that is the same as or similar to remote AV system 114 of FIG. 1), a fleet management system (e.g., a fleet management system that is the same as or similar to fleet management system 116 of FIG. 1), a V2I device (e.g., a V2I device that is the same as or similar to V2I device 110 of FIG. 1), and/or a V2I system (e.g., a V2I system that is the same as or similar to V2I system 118 of FIG. 1).

Safety controller 202g includes at least one device configured to be in communication with cameras 202a, LiDAR sensors 202b, radar sensors 202c, microphones 202d, communication device 202e, autonomous vehicle computer 202f, and/or DBW system 202h. In some examples, safety controller 202g includes one or more controllers (electrical controllers, electromechanical controllers, and/or the like) that are configured to generate and/or transmit control signals to operate one or more devices of vehicle 200 (e.g., powertrain control system 204, steering control system 206, brake system 208, and/or the like). In some embodiments, safety controller 202g is configured to generate control signals that take precedence over (e.g., overrides) control signals generated and/or transmitted by autonomous vehicle compute 202f.

DBW system 202h includes at least one device configured to be in communication with communication device 202e and/or autonomous vehicle compute 202f. In some examples, DBW system 202h includes one or more controllers (e.g., electrical controllers, electromechanical controllers, and/or the like) that are configured to generate and/or transmit control signals to operate one or more devices of vehicle 200 (e.g., powertrain control system 204, steering control system 206, brake system 208, and/or the like). Additionally, or alternatively, the one or more controllers of DBW system 202h are configured to generate and/or transmit control signals to operate at least one different device (e.g., a turn signal, headlights, door locks, windshield wipers, and/or the like) of vehicle 200.

Powertrain control system 204 includes at least one device configured to be in communication with DBW system 202h. In some examples, powertrain control system 204 includes at least one controller, actuator, and/or the like. In some embodiments, powertrain control system 204 receives control signals from DBW system 202h and powertrain control system 204 causes vehicle 200 to make longitudinal vehicle motion, such as start moving forward, stop moving forward, start moving backward, stop moving backward, accelerate in a direction, decelerate in a direction or to make lateral vehicle motion such as performing a left turn, performing a right turn, and/or the like. In an example, powertrain control system 204 causes the energy (e.g., fuel, electricity, and/or the like) provided to a motor of the vehicle to increase, remain the same, or decrease, thereby causing at least one wheel of vehicle 200 to rotate or not rotate.

Steering control system 206 includes at least one device configured to rotate one or more wheels of vehicle 200. In some examples, steering control system 206 includes at least one controller, actuator, and/or the like. In some embodiments, steering control system 206 causes the front two wheels and/or the rear two wheels of vehicle 200 to rotate to the left or right to cause vehicle 200 to turn to the left or right. In other words, steering control system 206 causes activities necessary for the regulation of the y-axis component of vehicle motion.

Brake system 208 includes at least one device configured to actuate one or more brakes to cause vehicle 200 to reduce speed and/or remain stationary. In some examples, brake system 208 includes at least one controller and/or actuator that is configured to cause one or more calipers associated with one or more wheels of vehicle 200 to close on a corresponding rotor of vehicle 200. Additionally, or alternatively, in some examples brake system 208 includes an automatic emergency braking (AEB) system, a regenerative braking system, and/or the like.

In some embodiments, vehicle 200 includes at least one platform sensor (not explicitly illustrated) that measures or infers properties of a state or a condition of vehicle 200. In some examples, vehicle 200 includes platform sensors such as a global positioning system (GPS) receiver, an inertial measurement unit (IMU), a wheel speed sensor, a wheel brake pressure sensor, a wheel torque sensor, an engine torque sensor, a steering angle sensor, and/or the like. Although brake system 208 is illustrated to be located in the near side of vehicle 200 in FIG. 2, brake system 208 may be located anywhere in vehicle 200.

Referring now to FIG. 3, illustrated is a schematic diagram of a device 300. As illustrated, device 300 includes processor 304, memory 306, storage component 308, input interface 310, output interface 312, communication interface 314, and bus 302. In some embodiments, device 300 corresponds to at least one device of vehicles 102, remote AV system 114, the fleet management system 116, the vehicle-to-infrastructure system 118, and/or network 112. In some embodiments, one or more devices of vehicles 102, remote AV system 114, the fleet management system 116, the vehicle-to-infrastructure system 118, and/or network 112, and/or one or more devices of network 112 (e.g., one or more devices of a system of network 112) include at least one device 300 and/or at least one component of device 300. As shown in FIG. 3, device 300 includes bus 302, processor 304, memory 306, storage component 308, input interface 310, output interface 312, and communication interface 314.

Bus 302 includes a component that permits communication among the components of device 300. In some cases, the processor 304 includes a processor (e.g., a central processing unit (CPU), a graphics processing unit (GPU), an accelerated processing unit (APU), and/or the like), a microphone, a digital signal processor (DSP), and/or any processing component (e.g., a field-programmable gate array (FPGA), an application specific integrated circuit (ASIC), and/or the like) that can be programmed to perform at least one function. Memory 306 includes random access memory (RAM), read-only memory (ROM), and/or another type of dynamic and/or static storage device (e.g., flash memory, magnetic memory, optical memory, and/or the like) that stores data and/or instructions for use by processor 304.

Storage component 308 stores data and/or software related to the operation and use of device 300. In some examples, storage component 308 includes a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, a CD-ROM, RAM, PROM, EPROM, FLASH-EPROM, NV-RAM, and/or another type of computer readable medium, along with a corresponding drive.

Input interface 310 includes a component that permits device 300 to receive information, such as via user input (e.g., a touchscreen display, a keyboard, a keypad, a mouse, a button, a switch, a microphone, a camera, and/or the like). Additionally or alternatively, in some embodiments input interface 310 includes a sensor that senses information (e.g., a global positioning system (GPS) receiver, an accelerometer, a gyroscope, an actuator, and/or the like). Output interface 312 includes a component that provides output information from device 300 (e.g., a display, a speaker, one or more light-emitting diodes (LEDs), and/or the like).

In some embodiments, communication interface 314 includes a transceiver-like component (e.g., a transceiver, a separate receiver and transmitter, and/or the like) that permits device 300 to communicate with other devices via a wired connection, a wireless connection, or a combination of wired and wireless connections. In some examples, communication interface 314 permits device 300 to receive information from another device and/or provide information to another device. In some examples, communication interface 314 includes an Ethernet interface, an optical interface, a coaxial interface, an infrared interface, a radio frequency (RF) interface, a universal serial bus (USB) interface, a WiFi® interface, a cellular network interface, and/or the like.

In some embodiments, device 300 performs one or more processes described herein. Device 300 performs these processes based on processor 304 executing software instructions stored by a computer-readable medium, such as memory 305 and/or storage component 308. A computer-readable medium (e.g., a non-transitory computer readable medium) is defined herein as a non-transitory memory device. A non-transitory memory device includes memory space located inside a single physical storage device or memory space spread across multiple physical storage devices.

In some embodiments, software instructions are read into memory 306 and/or storage component 308 from another computer-readable medium or from another device via communication interface 314. When executed, software instructions stored in memory 306 and/or storage component 308 cause processor 304 to perform one or more processes described herein. Additionally or alternatively, hardwired circuitry is used in place of or in combination with software instructions to perform one or more processes described herein. Thus, embodiments described herein are not limited to any specific combination of hardware circuitry and software unless explicitly stated otherwise.

Memory 306 and/or storage component 308 includes data storage or at least one data structure (e.g., a database and/or the like). Device 300 is capable of receiving information from, storing information in, communicating information to, or searching information stored in the data storage or the at least one data structure in memory 306 or storage component 308. In some examples, the information includes network data, input data, output data, or any combination thereof.

In some embodiments, device 300 is configured to execute software instructions that are either stored in memory 306 and/or in the memory of another device (e.g., another device that is the same as or similar to device 300). As used herein, the term "module" refers to at least one instruction stored in memory 306 and/or in the memory of another device that, when executed by processor 304 and/or by a processor of another device (e.g., another device that is the same as or similar to device 300) cause device 300 (e.g., at least one component of device 300) to perform one or more processes described herein. In some embodiments, a module is implemented in software, firmware, hardware, and/or the like.

The number and arrangement of components illustrated in FIG. 3 are provided as an example. In some embodiments, device 300 can include additional components, fewer components, different components, or differently arranged components than those illustrated in FIG. 3. Additionally or alternatively, a set of components (e.g., one or more components) of device 300 can perform one or more functions described as being performed by another component or another set of components of device 300.

Figure 4:
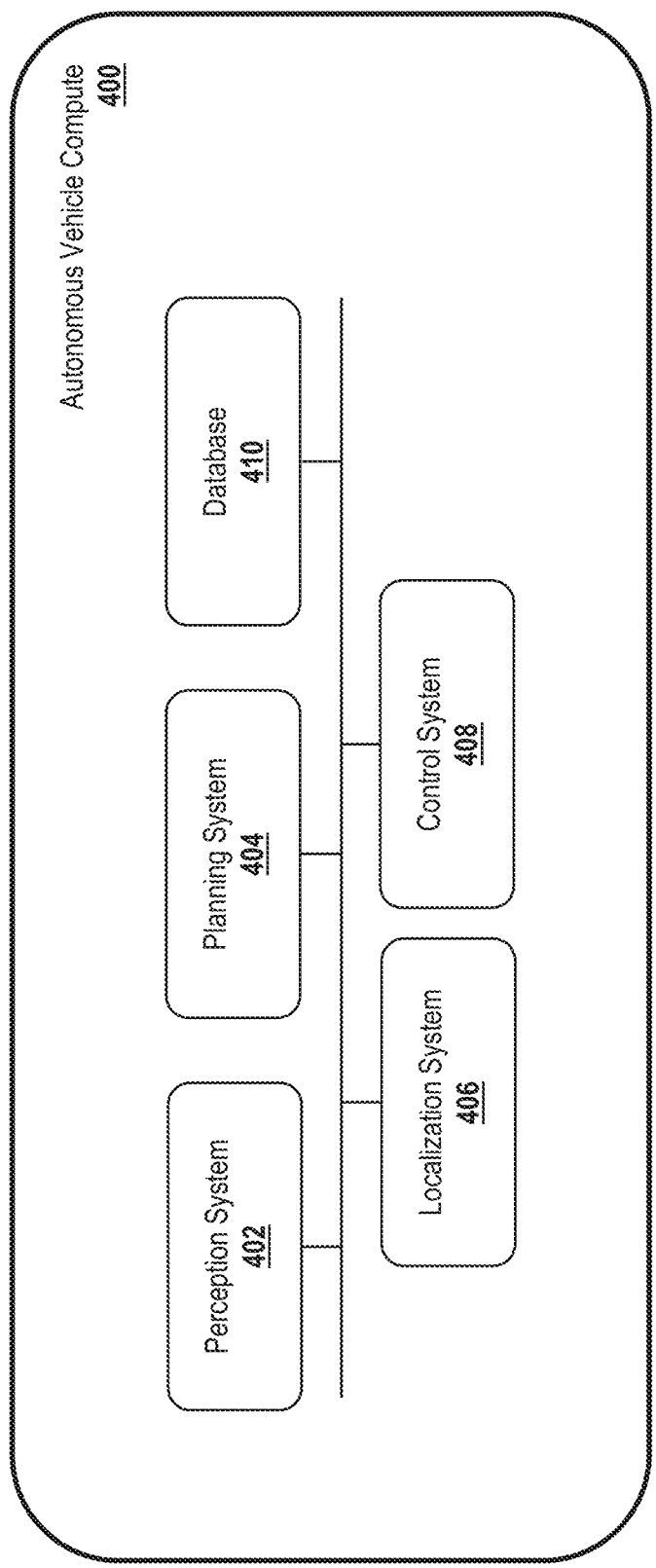
FIG. 4 is a diagram of certain components of an autonomous system.

Referring now to FIG. 4, illustrated is an example block diagram of an autonomous vehicle compute 400 (sometimes referred to as an "AV stack"). As illustrated, autonomous vehicle compute 400 includes perception system 402 (sometimes referred to as a perception module), planning system 404 (sometimes referred to as a planning module), localization system 406 (sometimes referred to as a localization module), control system 408 (sometimes referred to as a control module), and database 410. In some embodiments, perception system 402, planning system 404, localization system 406, control system 408, and database 410 are included and/or implemented in an autonomous navigation system of a vehicle (e.g., autonomous vehicle compute 202f of vehicle 200). Additionally, or alternatively, in some embodiments perception system 402, planning system 404, localization system 406, control system 408, and database 410 are included in one or more standalone systems (e.g., one or more systems that are the same as or similar to autonomous vehicle compute 400 and/or the like). In some examples, perception system 402, planning system 404, localization system 406, control system 408, and database 410 are included in one or more standalone systems that are located in a vehicle and/or at least one remote system as described herein. In some embodiments, any and/or all of the systems included in autonomous vehicle compute 400 are implemented in software (e.g., in software instructions stored in memory), computer hardware (e.g., by microprocessors, microcontrollers, application-specific integrated circuits (ASICs), Field Programmable Gate Arrays (FPGAs), and/or the like), or combinations of computer software and computer hardware. It will also be understood that, in some embodiments, autonomous vehicle compute 400 is configured to be in communication with a remote system (e.g., an autonomous vehicle system that is the same as or similar to remote AV system 114, a fleet management system 116 that is the same as or similar to fleet management system 116, a V2I system that is the same as or similar to V2I system 118, and/or the like).

In some embodiments, perception system 402 receives data associated with at least one physical object (e.g., data that is used by perception system 402 to detect the at least one physical object) in an environment and classifies the at least one physical object. In some examples, perception system 402 receives image data captured by at least one camera (e.g., cameras 202a), the image associated with (e.g., representing) one or more physical objects within a field of view of the at least one camera. In such an example, perception system 402 classifies at least one physical object based on one or more groupings of physical objects (e.g., bicycles, vehicles, traffic signs, pedestrians, and/or the like). In some embodiments, perception system 402 transmits data associated with the classification of the physical objects to planning system 404 based on perception system 402 classifying the physical objects.

In some embodiments, planning system 404 receives data associated with a destination and generates data associated with at least one route (e.g., routes 106) along which a vehicle (e.g., vehicles 102) can travel along toward a destination. In some embodiments, planning system 404 periodically or continuously receives data from perception system 402 (e.g., data associated with the classification of physical objects, described above) and planning system 404 updates the at least one trajectory or generates at least one different trajectory based on the data generated by perception system 402. In other words, planning system 404 may perform tactical function-related tasks that are required to operate vehicle 102 in on-road traffic. Tactical efforts involve maneuvering the vehicle in traffic during a trip, including but not limited to deciding whether and when to overtake another vehicle, change lanes, or selecting an appropriate speed, acceleration, deacceleration, etc. In some embodiments, planning system 404 receives data associated with an updated position of a vehicle (e.g., vehicles 102) from localization system 406 and planning system 404 updates the at least one trajectory or generates at least one different trajectory based on the data generated by localization system 406.

In some embodiments, localization system 406 receives data associated with (e.g., representing) a location of a vehicle (e.g., vehicles 102) in an area. In some examples, localization system 406 receives LiDAR data associated with at least one point cloud generated by at least one LiDAR sensor (e.g., LiDAR sensors 202b). In certain examples, localization system 406 receives data associated with at least one point cloud from multiple LiDAR sensors and localization system 406 generates a combined point cloud based on each of the point clouds. In these examples, localization system 406 compares the at least one point cloud or the combined point cloud to two-dimensional (2D) and/or a three-dimensional (3D) map of the area stored in database 410. Localization system 406 then determines the position of the vehicle in the area based on localization system 406 comparing the at least one point cloud or the combined point cloud to the map. In some embodiments, the map includes a combined point cloud of the area generated prior to navigation of the vehicle. In some embodiments, maps include, without limitation, high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations thereof), and maps describing the spatial locations of road features such as crosswalks, traffic signs or other travel signals of various types. In some embodiments, the map is generated in real-time based on the data received by the perception system.

In another example, localization system 406 receives Global Navigation Satellite System (GNSS) data generated by a global positioning system (GPS) receiver. In some examples, localization system 406 receives GNSS data associated with the location of the vehicle in the area and localization system 406 determines a latitude and longitude of the vehicle in the area. In such an example, localization system 406 determines the position of the vehicle in the area based on the latitude and longitude of the vehicle. In some embodiments, localization system 406 generates data associated with the position of the vehicle. In some examples, localization system 406 generates data associated with the position of the vehicle based on localization system 406 determining the position of the vehicle. In such an example, the data associated with the position of the vehicle includes data associated with one or more semantic properties corresponding to the position of the vehicle.

In some embodiments, control system 408 receives data associated with at least one trajectory from planning system 404 and control system 408 controls operation of the vehicle. In some examples, control system 408 receives data associated with at least one trajectory from planning system 404 and control system 408 controls operation of the vehicle by generating and transmitting control signals to cause a powertrain control system (e.g., DBW system 202h, powertrain control system 204, and/or the like), a steering control system (e.g., steering control system 206), and/or a brake system (e.g., brake system 208) to operate. For example, control system 408 is configured to perform operational functions such as a lateral vehicle motion control or a longitudinal vehicle motion control. The lateral vehicle motion control causes activities necessary for the regulation of the y-axis component of vehicle motion. The longitudinal vehicle motion control causes activities necessary for the regulation of the x-axis component of vehicle motion. In an example, where a trajectory includes a left turn, control system 408 transmits a control signal to cause steering control system 206 to adjust a steering angle of vehicle 200, thereby causing vehicle 200 to turn left. Additionally, or alternatively, control system 408 generates and transmits control signals to cause other devices (e.g., headlights, turn signal, door locks, windshield wipers, and/or the like) of vehicle 200 to change states.

In some embodiments, perception system 402, planning system 404, localization system 406, and/or control system 408 implement at least one machine learning model (e.g., at least one multilayer perceptron (MLP), at least one convolutional neural network (CNN), at least one recurrent neural network (RNN), at least one autoencoder, at least one transformer, and/or the like). In some examples, perception system 402, planning system 404, localization system 406, and/or control system 408 implement at least one machine learning model alone or in combination with one or more of the above-noted systems. In some examples, perception system 402, planning system 404, localization system 406, and/or control system 408 implement at least one machine learning model as part of a pipeline (e.g., a pipeline for identifying one or more objects located in an environment and/or the like). An example of an implementation of a machine learning model is included below with respect to FIGS. 4B-4D.

Database 410 stores data that is transmitted to, received from, and/or updated by perception system 402, planning system 404, localization system 406 and/or control system 408. In some examples, database 410 includes a storage component (e.g., a storage component that is the same as or similar to storage component 308 of FIG. 3) that stores data and/or software related to the operation and uses at least one system of autonomous vehicle compute 400. In some embodiments, database 410 stores data associated with 2D and/or 3D maps of at least one area. In some examples, database 410 stores data associated with 2D and/or 3D maps of a portion of a city, multiple portions of multiple cities, multiple cities, a county, a state, a State (e.g., a country), and/or the like). In such an example, a vehicle (e.g., a vehicle that is the same as or similar to vehicles 102 and/or vehicle 200) can drive along one or more drivable regions (e.g., single-lane roads, multi-lane roads, highways, back roads, off road trails, and/or the like) and cause at least one LiDAR sensor (e.g., a LiDAR sensor that is the same as or similar to LiDAR sensors 202b) to generate data associated with an image representing the objects included in a field of view of the at least one LiDAR sensor.

In some embodiments, database 410 can be implemented across a plurality of devices. In some examples, database 410 is included in a vehicle (e.g., a vehicle that is the same as or similar to vehicles 102 and/or vehicle 200), an autonomous vehicle system (e.g., an autonomous vehicle system that is the same as or similar to remote AV system 114, a fleet management system (e.g., a fleet management system that is the same as or similar to fleet management system 116 of FIG. 1, a V2I system (e.g., a V2I system that is the same as or similar to V2I system 118 of FIG. 1) and/or the like.

Figure 4B:
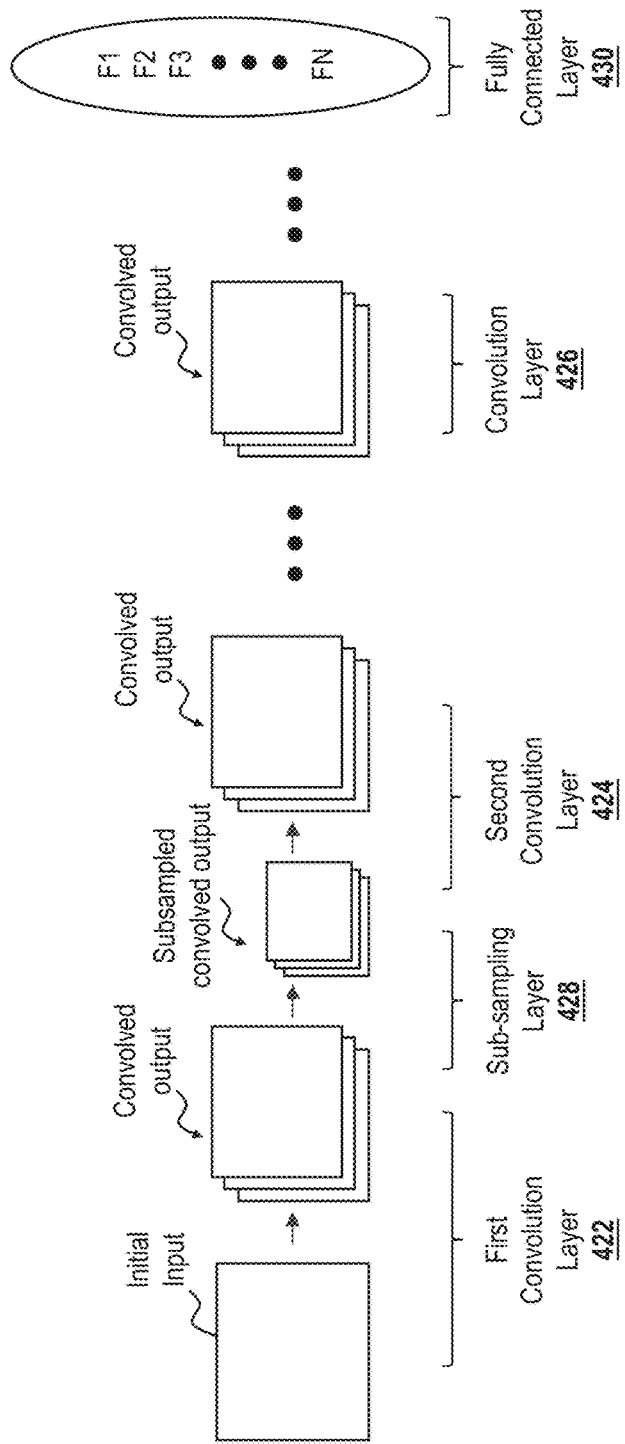
FIG. 4B is a diagram of an implementation of a neural network.

Referring now to FIG. 4B, illustrated is a diagram of an implementation of a machine learning model. More specifically, illustrated is a diagram of an implementation of a convolutional neural network (CNN) 420. For purposes of illustration, the following description of CNN 420 will be with respect to an implementation of CNN 420 by perception system 402. However, it will be understood that in some examples CNN 420 (e.g., one or more components of CNN 420) is implemented by other systems different from, or in addition to, perception system 402 such as planning system 404, localization system 406, and/or control system 408. While CNN 420 includes certain features as described herein, these features are provided for the purpose of illustration and are not intended to limit the present disclosure.

CNN 420 includes a plurality of convolution layers including first convolution layer 422, second convolution layer 424, and convolution layer 426. In some embodiments, CNN 420 includes sub-sampling layer 428 (sometimes referred to as a pooling layer). In some embodiments, sub-sampling layer 428 and/or other subsampling layers have a dimension (i.e., an amount of nodes) that is less than a dimension of an upstream system. By virtue of sub-sampling layer 428 having a dimension that is less than a dimension of an upstream layer, CNN 420 consolidates the amount of data associated with the initial input and/or the output of an upstream layer to thereby decrease the amount of computations necessary for CNN 420 to perform downstream convolution operations. Additionally, or alternatively, by virtue of sub-sampling layer 428 being associated with (e.g., configured to perform) at least one subsampling function (as described below with respect to FIGS. 4C and 4D), CNN 420 consolidates the amount of data associated with the initial input.

Perception system 402 performs convolution operations based on perception system 402 providing respective inputs and/or outputs associated with each of first convolution layer 422, second convolution layer 424, and convolution layer 426 to generate respective outputs. In some examples, perception system 402 implements CNN 420 based on perception system 402 providing data as input to first convolution layer 422, second convolution layer 424, and convolution layer 426. In such an example, perception system 402 provides the data as input to first convolution layer 422, second convolution layer 424, and convolution layer 426 based on perception system 402 receiving data from one or more different systems (e.g., one or more systems of a vehicle that is the same as or similar to vehicle 102), a remote AV system that is the same as or similar to remote AV system 114, a fleet management system that is the same as or similar to fleet management system 116, a V2I system that is the same as or similar to V2I system 118, and/or the like). A detailed description of convolution operations is included below with respect to FIG. 4C.

In some embodiments, perception system 402 provides data associated with an input (referred to as an initial input) to first convolution layer 422 and perception system 402 generates data associated with an output using first convolution layer 422. In some embodiments, perception system 402 provides an output generated by a convolution layer as input to a different convolution layer. For example, perception system 402 provides the output of first convolution layer 422 as input to sub-sampling layer 428, second convolution layer 424, and/or convolution layer 426. In such an example, first convolution layer 422 is referred to as an upstream layer and sub-sampling layer 428, second convolution layer 424, and/or convolution layer 426 are referred to as downstream layers. Similarly, in some embodiments perception system 402 provides the output of sub-sampling layer 428 to second convolution layer 424 and/or convolution layer 426 and, in this example, sub-sampling layer 428 would be referred to as an upstream layer and second convolution layer 424 and/or convolution layer 426 would be referred to as downstream layers.

In some embodiments, perception system 402 processes the data associated with the input provided to CNN 420 before perception system 402 provides the input to CNN 420. For example, perception system 402 processes the data associated with the input provided to CNN 420 based on perception system 402 normalizing sensor data (e.g., image data, LiDAR data, radar data, and/or the like).

In some embodiments, CNN 420 generates an output based on perception system 402 performing convolution operations associated with each convolution layer. In some examples, CNN 420 generates an output based on perception system 402 performing convolution operations associated with each convolution layer and an initial input. In some embodiments, perception system 402 generates the output and provides the output as fully connected layer 430. In some examples, perception system 402 provides the output of convolution layer 426 as fully connected layer 430, where fully connected layer 430 includes data associated with a plurality of feature values referred to as F1, F2 . . . FN. In this example, the output of convolution layer 426 includes data associated with a plurality of output feature values that represent a prediction.

In some embodiments, perception system 402 identifies a prediction from among a plurality of predictions based on perception system 402 identifying a feature value that is associated with the highest likelihood of being the correct prediction from among the plurality of predictions. For example, where fully connected layer 430 includes feature values F1, F2, . . . FN, and F1 is the greatest feature value, perception system 402 identifies the prediction associated with F1 as being the correct prediction from among the plurality of predictions. In some embodiments, perception system 402 trains CNN 420 to generate the prediction. In some examples, perception system 402 trains CNN 420 to generate the prediction based on perception system 402 providing training data associated with the prediction to CNN 420.

Figure 4C:
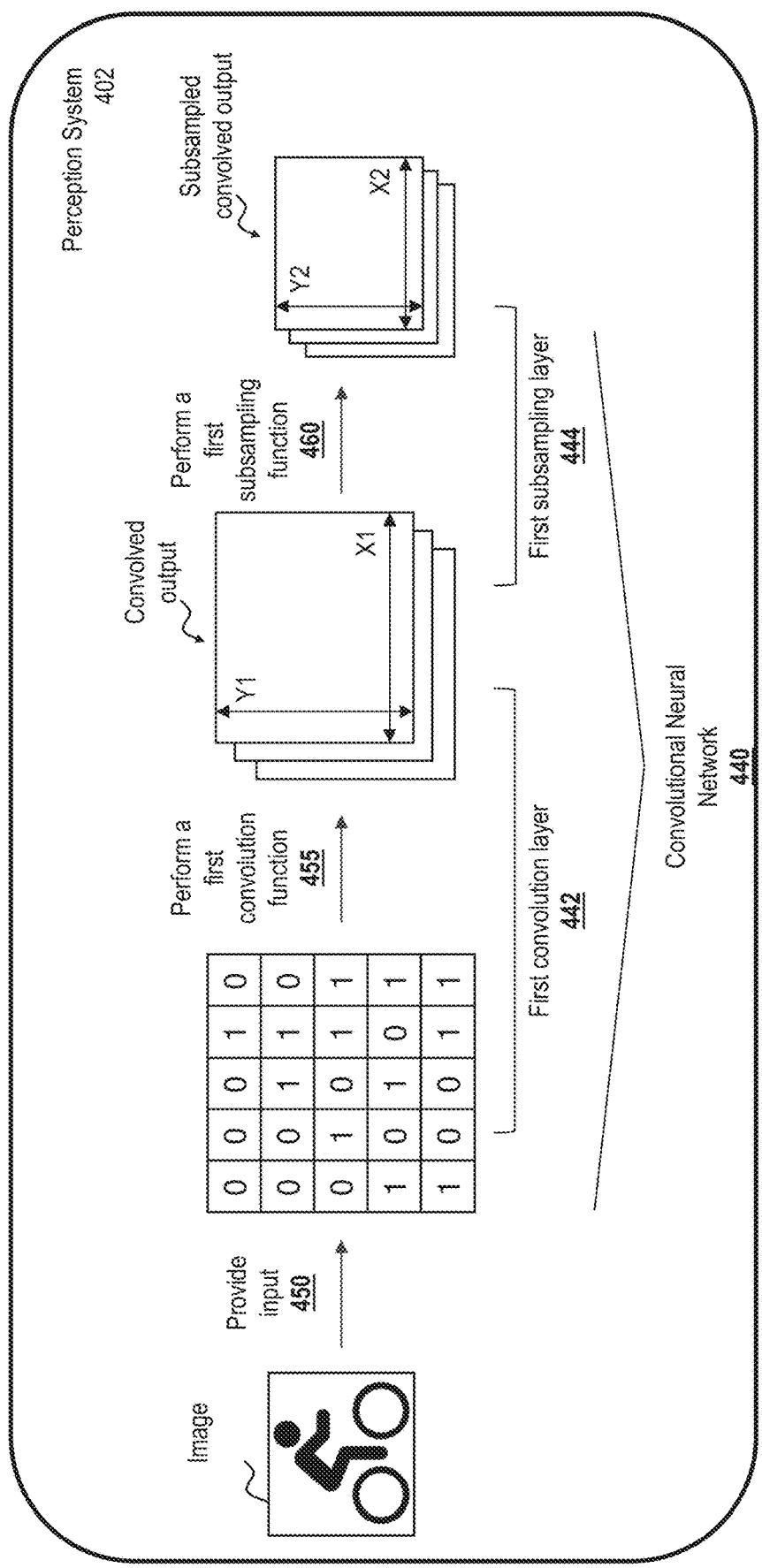
FIGS. 4C and 4D are a diagram illustrating example operation of a convolutional neural network.
Figure 4D:
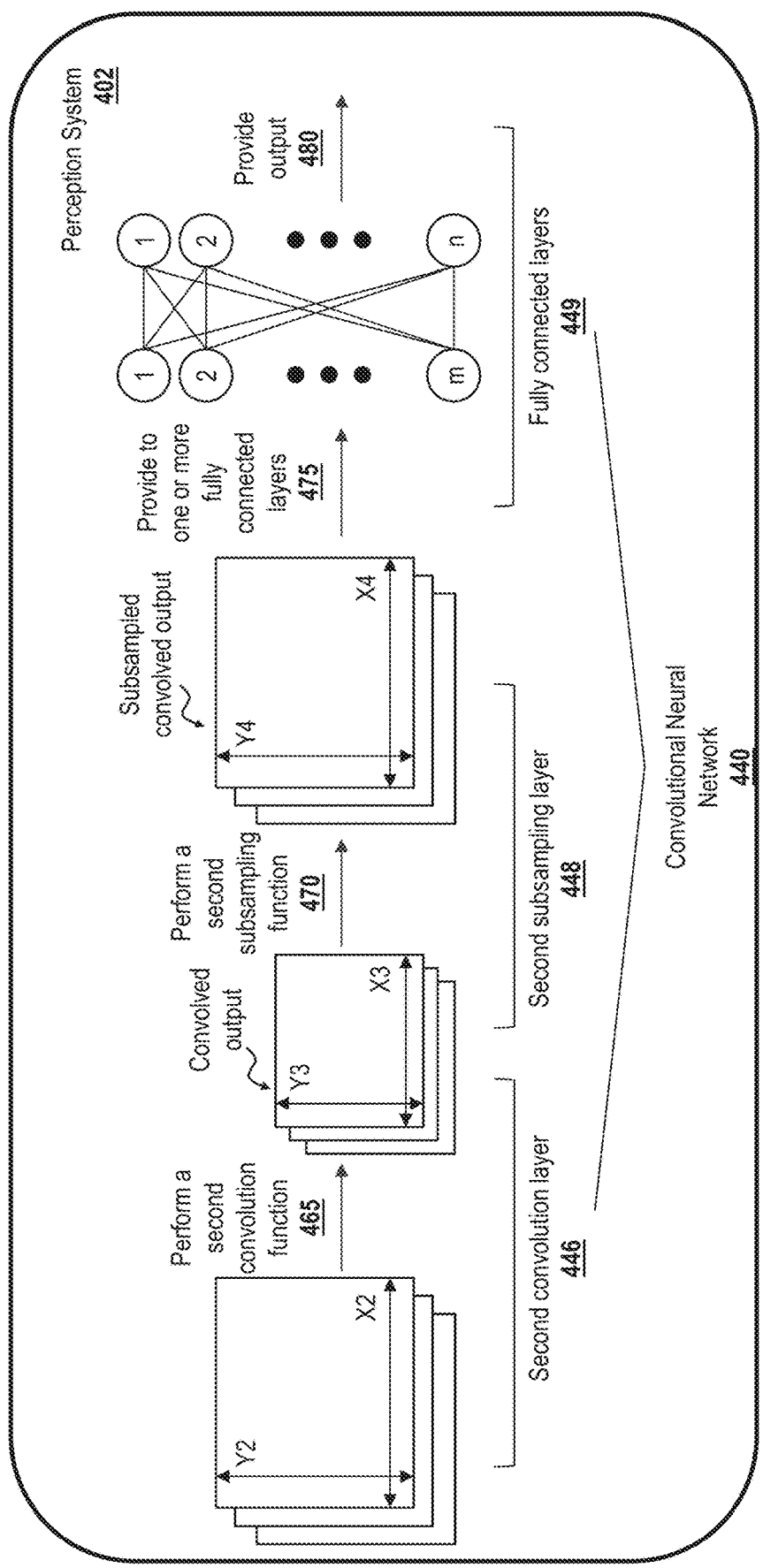

Referring now to FIGS. 4C and 4D, illustrated is a diagram of example operation of CNN 440 by perception system 402. In some embodiments, CNN 440 (e.g., one or more components of CNN 440) is the same as, or similar to, CNN 420 (e.g., one or more components of CNN 420) (see FIG. 4B).

At step 450, perception system 402 provides data associated with an image as input to CNN 440 (step 450). For example, as illustrated, perception system 402 provides the data associated with the image to CNN 440, where the image is a greyscale image represented as values stored in a two-dimensional (2D) array. In some embodiments, the data associated with the image may include data associated with a color image, the color image represented as values stored in a three-dimensional (3D) array. Additionally, or alternatively, the data associated with the image may include data associated with an infrared image, a radar image, and/or the like.

At step 455, CNN 440 performs a first convolution function. For example, CNN 440 performs the first convolution function based on CNN 440 providing the values representing the image as input to one or more neurons (not explicitly illustrated) included in first convolution layer 442. In this example, the values representing the image can correspond to values representing a region of the image (sometimes referred to as a receptive field). In some embodiments, each neuron is associated with a filter (not explicitly illustrated). A filter (sometimes referred to as a kernel) is representable as an array of values that corresponds in size to the values provided as input to the neuron. In one example, a filter may be configured to identify edges (e.g., horizontal lines, vertical lines, straight lines, and/or the like). In successive convolution layers, the filters associated with neurons may be configured to identify successively more complex patterns (e.g., arcs, objects, and/or the like).

In some embodiments, CNN 440 performs the first convolution function based on CNN 440 multiplying the values provided as input to each of the one or more neurons included in first convolution layer 442 with the values of the filter that corresponds to each of the one or more neurons. For example, CNN 440 can multiply the values provided as input to each of the one or more neurons included in first convolution layer 442 with the values of the filter that corresponds to each of the one or more neurons to generate a single value or an array of values as an output. In some embodiments, the collective output of the neurons of first convolution layer 442 is referred to as a convolved output. In some embodiments, where each neuron has the same filter, the convolved output is referred to as a feature map.

In some embodiments, CNN 440 provides the outputs of each neuron of first convolutional layer 442 to neurons of a downstream layer. For purposes of clarity, an upstream layer can be a layer that transmits data to a different layer (referred to as a downstream layer). For example, CNN 440 can provide the outputs of each neuron of first convolutional layer 442 to corresponding neurons of a subsampling layer. In an example, CNN 440 provides the outputs of each neuron of first convolutional layer 442 to corresponding neurons of first subsampling layer 444. In some embodiments, CNN 440 adds a bias value to the aggregates of all the values provided to each neuron of the downstream layer. For example, CNN 440 adds a bias value to the aggregates of all the values provided to each neuron of first subsampling layer 444. In such an example, CNN 440 determines a final value to provide to each neuron of first subsampling layer 444 based on the aggregates of all the values provided to each neuron and an activation function associated with each neuron of first subsampling layer 444.

At step 460, CNN 440 performs a first subsampling function. For example, CNN 440 can perform a first subsampling function based on CNN 440 providing the values output by first convolution layer 442 to corresponding neurons of first subsampling layer 444. In some embodiments, CNN 440 performs the first subsampling function based on an aggregation function. In an example, CNN 440 performs the first subsampling function based on CNN 440 determining the maximum input among the values provided to a given neuron (referred to as a max pooling function). In another example, CNN 440 performs the first subsampling function based on CNN 440 determining the average input among the values provided to a given neuron (referred to as an average pooling function). In some embodiments, CNN 440 generates an output based on CNN 440 providing the values to each neuron of first subsampling layer 444, the output sometimes referred to as a subsampled convolved output.

At step 465, CNN 440 performs a second convolution function. In some embodiments, CNN 440 performs the second convolution function in a manner similar to how CNN 440 performed the first convolution function, described above. In some embodiments, CNN 440 performs the second convolution function based on CNN 440 providing the values output by first subsampling layer 444 as input to one or more neurons (not explicitly illustrated) included in second convolution layer 446. In some embodiments, each neuron of second convolution layer 446 is associated with a filter, as described above. The filter(s) associated with second convolution layer 446 may be configured to identify more complex patterns than the filter associated with first convolution layer 442, as described above.

In some embodiments, CNN 440 performs the second convolution function based on CNN 440 multiplying the values provided as input to each of the one or more neurons included in second convolution layer 446 with the values of the filter that corresponds to each of the one or more neurons. For example, CNN 440 can multiply the values provided as input to each of the one or more neurons included in second convolution layer 446 with the values of the filter that corresponds to each of the one or more neurons to generate a single value or an array of values as an output.

In some embodiments, CNN 440 provides the outputs of each neuron of second convolutional layer 446 to neurons of a downstream layer. For example, CNN 440 can provide the outputs of each neuron of first convolutional layer 442 to corresponding neurons of a subsampling layer. In an example, CNN 440 provides the outputs of each neuron of first convolutional layer 442 to corresponding neurons of second subsampling layer 448. In some embodiments, CNN 440 adds a bias value to the aggregates of all the values provided to each neuron of the downstream layer. For example, CNN 440 adds a bias value to the aggregates of all the values provided to each neuron of second subsampling layer 448. In such an example, CNN 440 determines a final value to provide to each neuron of second subsampling layer 448 based on the aggregates of all the values provided to each neuron and an activation function associated with each neuron of second subsampling layer 448.

At step 470, CNN 440 performs a second subsampling function. For example, CNN 440 can perform a second subsampling function based on CNN 440 providing the values output by second convolution layer 446 to corresponding neurons of second subsampling layer 448. In some embodiments, CNN 440 performs the second subsampling function based on CNN 440 using an aggregation function. In an example, CNN 440 performs the first subsampling function based on CNN 440 determining the maximum input or an average input among the values provided to a given neuron, as described above. In some embodiments, CNN 440 generates an output based on CNN 440 providing the values to each neuron of second subsampling layer 448.

At step 475, CNN 440 provides the output of each neuron of second subsampling layer 448 to fully connected layers 449. For example, CNN 440 provides the output of each neuron of second subsampling layer 448 to fully connected layers 449 to cause fully connected layers 449 to generate an output. In some embodiments, fully connected layers 449 are configured to generate an output associated with a prediction (sometimes referred to as a classification). The prediction may include an indication that an object included in the image provided as input to CNN 440 includes an object, a set of objects, and/or the like. In some embodiments, perception system 402 performs one or more operations and/or provides the data associated with the prediction to a different system, described herein.

Figure 5:
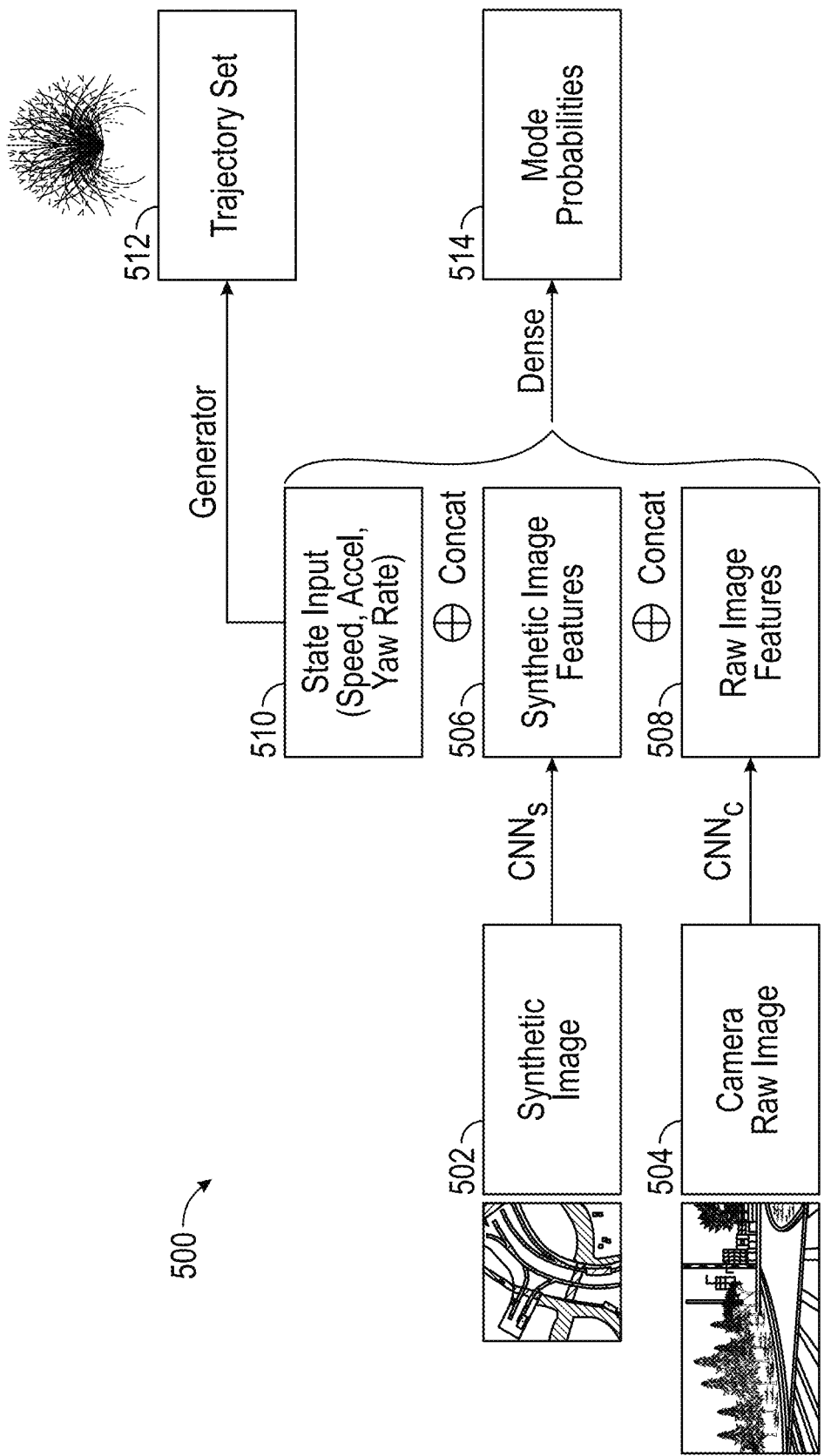
FIGS. 5-9 are diagrams of example implementations of machine learning models for fusing synthetic images from a perception system with data from additional sensor modalities, such as images from cameras.
Figure 6:
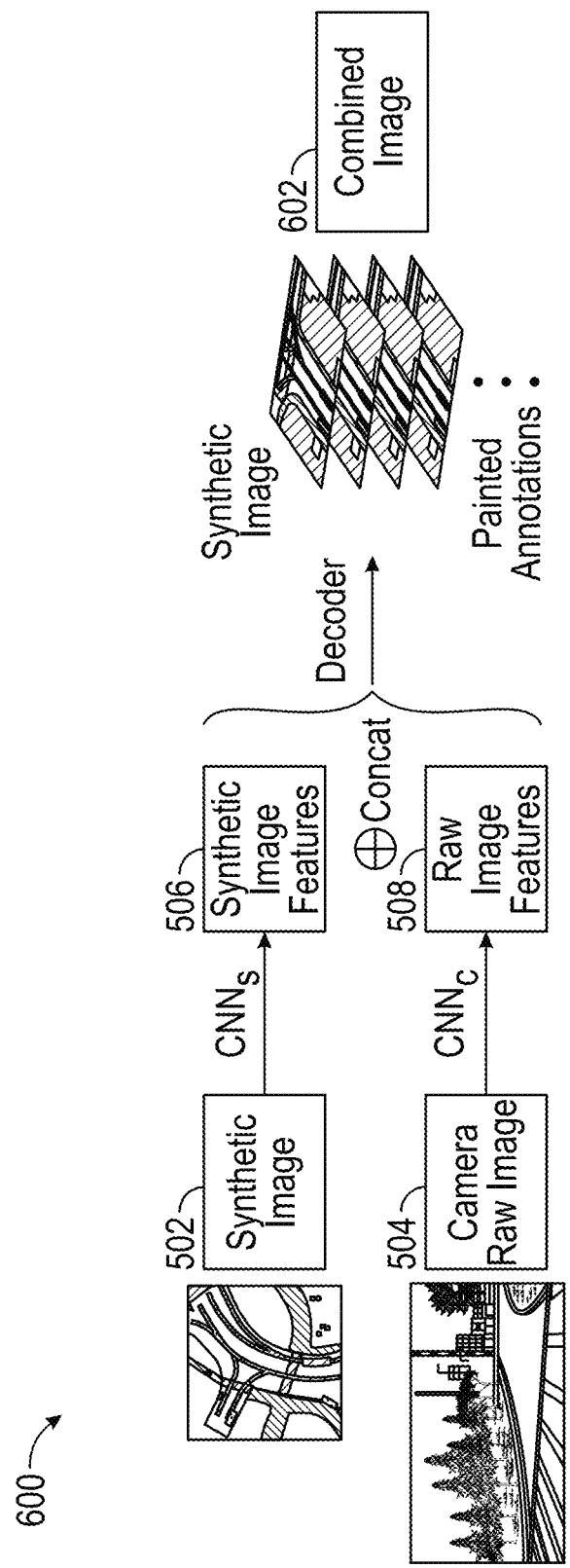
Figure 7:
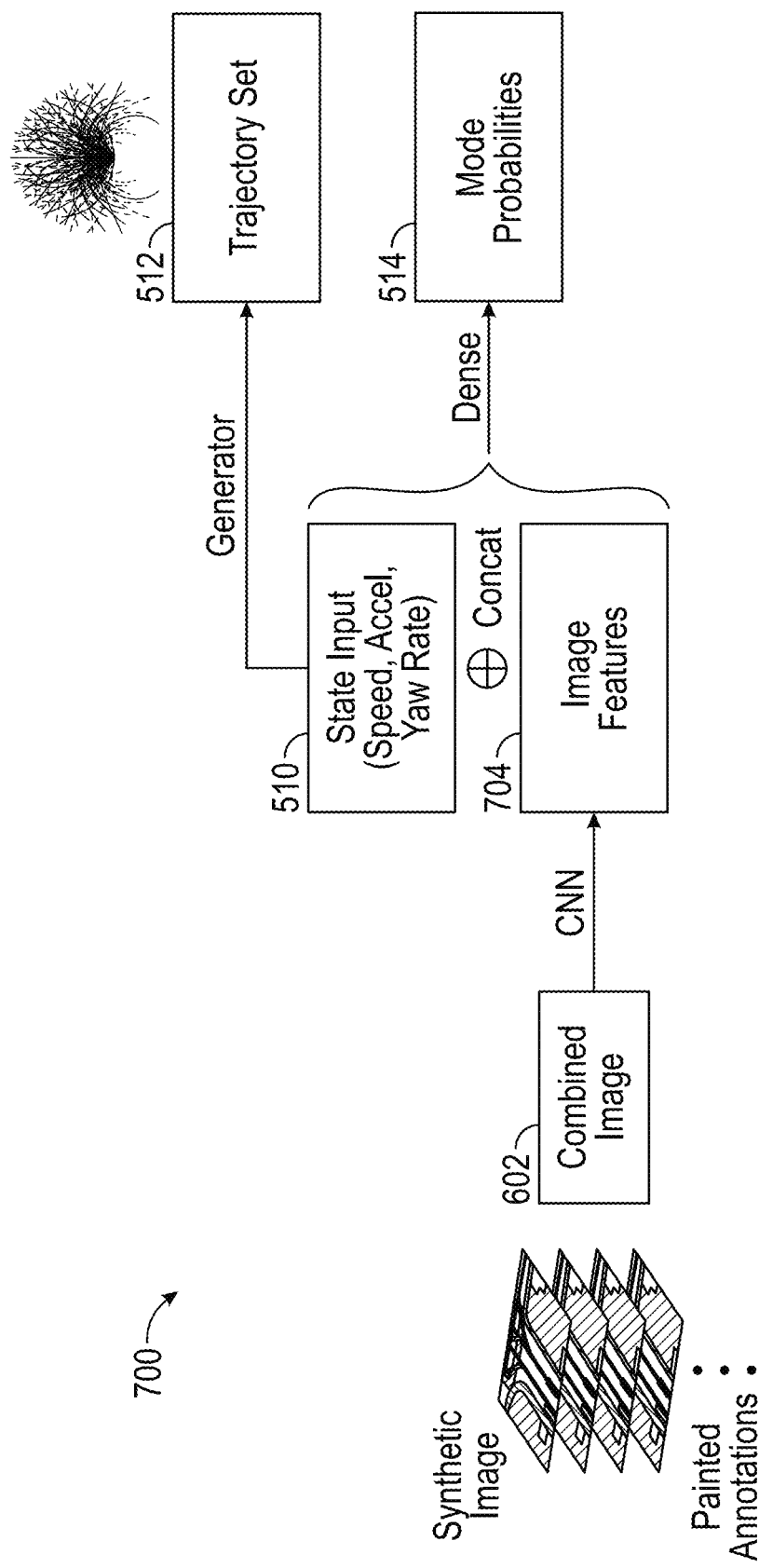
Figure 8:
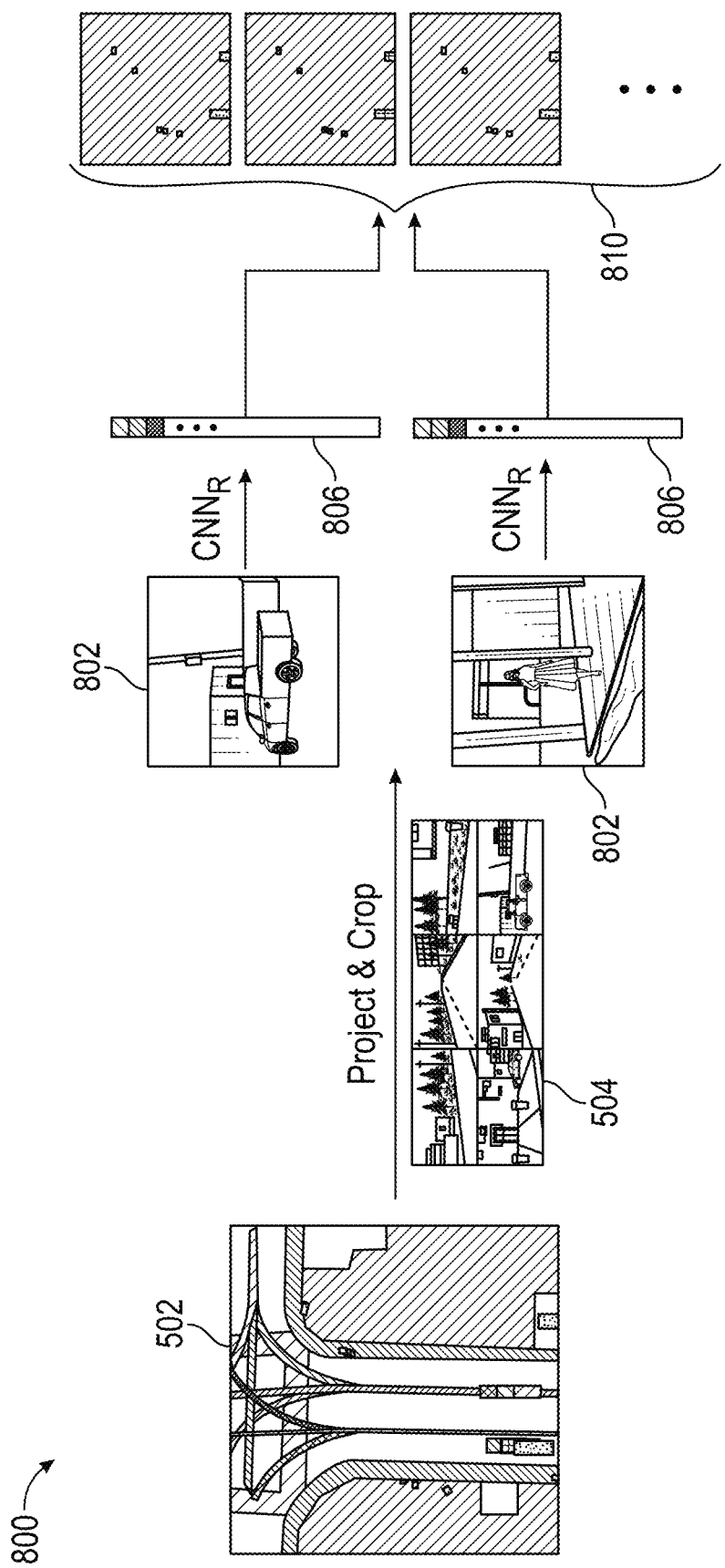
Figure 9:
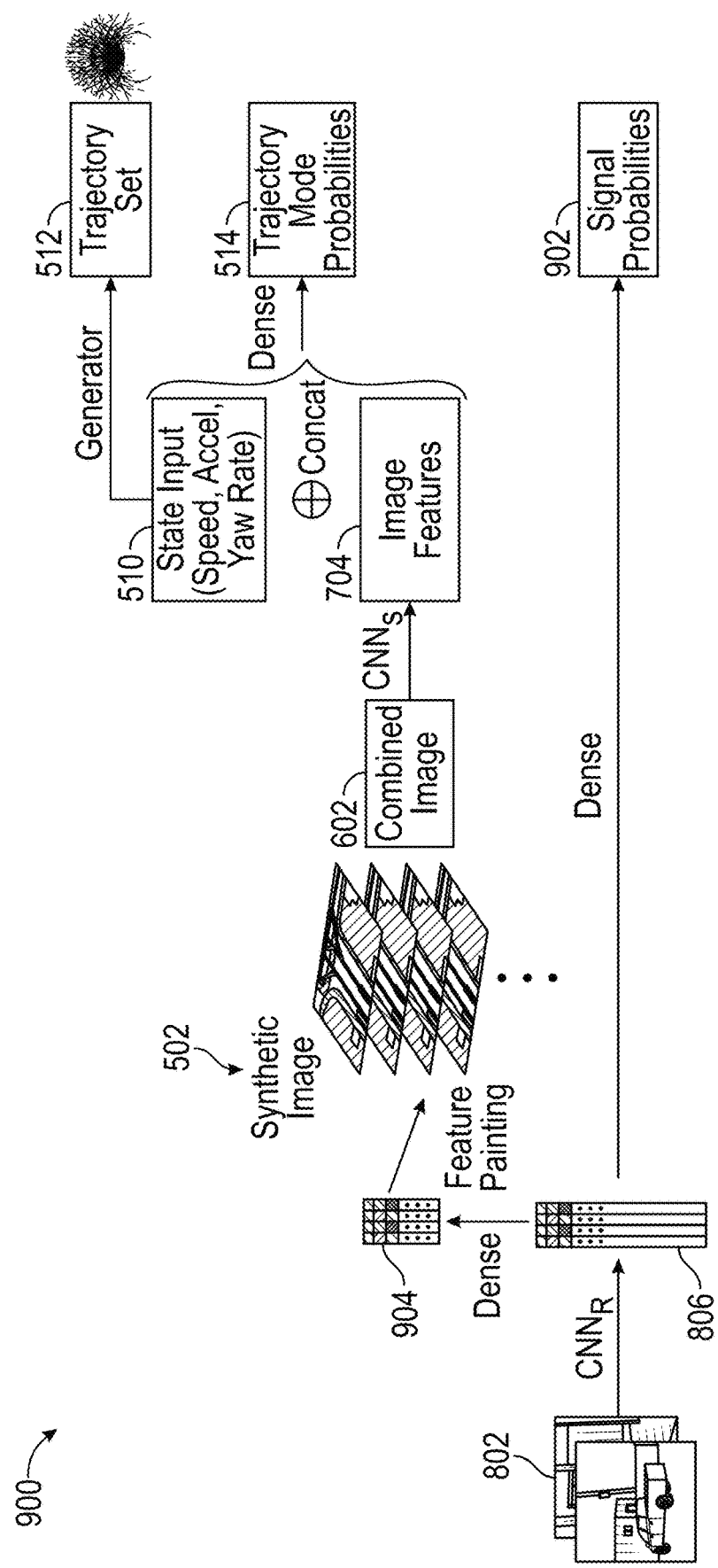

Referring now to FIGS. 5-9, illustrated are diagrams of example implementations of machine learning models for fusing synthetic images from a perception system, such as perception system 402, with data from additional sensor modalities, such as images from cameras 202a, for purposes such as object motion prediction or vehicle planning. Specifically, FIG. 5 depicts a first embodiment of a machine learning model fusing an output of a perception system with data from additional sensor modalities, in which learned features from the data of the additional sensor modalities and from the output of the perception system are concatenated and processed by a neural network for prediction or planning. FIGS. 6 and 7 depict a second embodiment of a machine learning model fusing an output of a perception system with data from additional sensor modalities, in which a combined image, combining both the output of a perception system and painted annotations to that output learned from data from additional sensor modalities, is processed by a neural network for prediction or planning. FIGS. 8 and 9 depict a third embodiment of a machine learning model fusing an output of a perception system with data from additional sensor modalities, in which features painted annotations to the output of a perception system are learned from data from additional sensor modalities concurrently with training the model for prediction or planning. Each embodiment is described in turn.

As shown in FIG. 5, the machine learning model 500 takes as input both the output of a perception system (such as perception system 402) and data from an additional sensor modality. In FIG. 5, the output of the perception system is a synthetic BEV image 502. For example, the image may depict an environment around a vehicle, objects within that environment (e.g., as shapes within the image), and calculated or detected trajectories of those objects. The shapes and trajectories may, for example, be color coded to indicate attributes of the shapes or trajectories, such as expected object class (e.g., pedestrian, bicycle, car, truck, etc.), speed, pose, acceleration, or the like, certainty regarding the assigned attributes, etc. Accordingly, the BEV image 502 may represent an understanding generated by the perception system of the environment. In FIG. 5, the data from the additional sensor modality is a raw image 504 from a camera. Illustratively, where the model 500 is used to predict motion of an object indicated within the BEV image 502, the raw image 504 may depict the view of the vehicle in the direction of the object, and as such picture the object. While only one raw image 504 is shown in FIG. 5, in some embodiments the model 500 may accept multiple images. For example, where the model 500 is used to conduct action planning for a vehicle, the model 500 may accept camera images from multiple points of view (e.g., front, rear, sides, etc.) of the vehicle. Moreover, while a camera image is used as an example of an additional sensor modality in FIG. 5, data from other sensor modalities may additionally or alternatively be used. For example, the raw image 504 may be replaced with data of a radar sensor 202c, microphone 202d, or other sensor modalities.

In FIG. 5, the synthetic image 502 and the raw image 504 are fed through respective convolutional neural networks, denoted $CNN_S$ and $CNN_C$. The respective $CNN_S$ may function similarly to the networks as described in FIGS. 4B-4D. Illustratively, each CNN may operate to take as input a respective image and provide as output learned features of that image, which features contribute to the output of the machine learning model 500 (e.g., the prediction motion of an object or planned action of a vehicle). Accordingly, the $CNN_S$ outputs a set of synthetic image features 506 and the $CNN_C$ outputs a set of raw image features 508.

The respective features 506 and 508 are then concatenated with state input 510. The particular state input 510 may vary, e.g., according to the desired output of the model 500. For example, where the model 500 is used to predict motion of an object in a vehicle's environment, the state input 510 may reflect known or estimated state of the object. Where the model 500 is used to plan actions of the vehicle, the state input 510 may reflect state of the vehicle, or state of one or more objects in the vehicle's environment, or a combination thereof. Examples of state information are depicted in FIG. 5, such as speed, acceleration, and yaw rate. Other non-limiting examples of state information are pitch, roll, pose (e.g., as a combination of pitch, roll, and yaw), and velocity (e.g., including a directionality vector). With respect to state of a vehicle, state information may include additional data, such as steering wheel angle, braking power, engine power, traction data, and the like.

The concatenated data is then fed into a generator, which generates a trajectory set 512, which may represent a set of possible trajectories based on the concatenated data. Illustratively, where the model 500 used to predict motion of an object in a vehicle's environment, the set 512 may reflect potential trajectories of the object. Where the model 500 is used to plan actions of a vehicle, the set 512 may include potential trajectories of the vehicle. The trajectory set 512 may illustratively be generated based on the state information 510, such as by applying a set of potential modifications (e.g., slowing, speeding up, and turning) to the state information 510 to generate possible trajectories. The trajectory set 512 may thus represent potential outputs of the model 500. In some embodiments, the trajectory set may be replaced with other outputs, such as possible actions of the vehicle independent of trajectory (e.g., brake, turn, accelerate, etc.).

To distinguish between the potential outputs, the concatenated data is further fed through a dense layer to generate a set of mode probabilities 514, representing probabilities for each potential output in the set 512. For example, the dense layer may operate to evaluate each potential output in the set 512 according to the concatenated data, and assign a probability that the potential output is correct. Accordingly, the model 500 can select on output of the set 512 (e.g., the potential output having the highest probability) as an output of the model 500.

While the trajectory set 512 is shown in FIG. 5 as generated via a generator, in some embodiments the trajectory set 512 is alternatively generated via the dense layer (e.g., along with the mode probabilities 514).

Training of the model 500 may occur based on gathered data reflecting correct outputs of the model 500. For example, when applied to motion prediction for an object, a training data set may be generated that includes a synthetic image identifying the object, a camera image depicting the object, and observed motion of the object subsequent to generation of the synthetic image and capture of the camera image. The observed motion may be observed, for example, based on later sensor data (e.g., subsequent lidar data that indicates movement of the object). The model 500 may then be trained such that the model 500 produces an output matching the observed motion. When applied to planning for a vehicle, the training data set may include a synthetic image of an environment of the vehicle, one or more camera images depicting that environment, and an observed action of a skilled human operator. The model 500 may then be trained such that the model 500 produces an output matching the observed action of the human operator.

Thereafter, the trained model 500 can be applied during operation of a vehicle. This application of the trained model 500, sometimes referred to as "inference", utilizes the trained model 500 to produce unknown outputs, such as the predicted motion of an object (where the motion is not yet known) or the planned action of a vehicle (where the action is not yet known). For example, the trained model 500 may be used during non-training operation of a vehicle to predict motion of objects around the vehicle by passing in a synthetic image 502 generated by a perception system of the vehicle (e.g., perception system 402), one or more camera raw images 504 of the object, and state information 510 of the object, thus producing as an output a motion of the object predicted to match actual motion of the object. Similarly, the trained model 500 may be used to plan an action of the vehicle by passing in a synthetic image 502 generated by a perception system of the vehicle (e.g., perception system 402), one or more camera raw images 504 of the environment around the vehicle, and state information 510 of the vehicle and/or objects in the environment, thus producing as an output an action for the vehicle predicted to match an action by a skilled human driver.

As discussed above, by combining a synthetic image 502 with data of additional sensor modalities, such as a raw image 504 of a camera, the model 500 can account for additional contextual information within the data of the additional sensor modalities, which information may be difficult or impossible to directly incorporate into the synthetic image 502 without negatively impacting the accuracy of the synthetic image 502. For example, while the synthetic image 502 may include a predicted trajectory of an object, the image 502 may not have been generated based on the data of the additional sensor modalities, and thus may lack contextual information such as the presence of signaling lights, limb position, etc., which contextual information would otherwise be used by a human to predict motion and/or plan action. Thus, incorporation of this data of additional sensor modalities may substantially improve motion prediction or planning. In some embodiments, the model 500 may therefore be implemented as part of a planning system 404. In other embodiments, the model 500 may be incorporated into a perception system 402. For example, the system 402 may utilize predicted motion of an object, as output by the model 500, to update the synthetic image 502.

While application of the model 500 to motion prediction is discussed above with respect to a single object, the models as disclosed herein may additionally or alternatively be applied to predict motion of multiple objects simultaneously. Such a configuration may enable the models to capture interrelated contextual information of multiple objects. For example, such a configuration may enable the model to more accurately predict how signals with respect to one object modify motion of another object (e.g., how the presence of brake lights or turn signals on one vehicle are likely to modify motion of another vehicle).

As noted above, FIGS. 6-9 depict additional embodiments of a machine learning model fusing an output of a perception system with data from additional sensor modalities. The additional embodiments include some elements similar or the same as the embodiment of FIG. 5, and thus description of these elements will not be repeated with respect to FIGS. 6-9. Reference numerals of FIG. 5 are repeated in FIGS. 6-9 to indicate elements similar to or the same as the embodiment of FIG. 5.

With reference to FIGS. 6-7, an additional embodiment of a machine learning model fusing an output of a perception system with data from additional sensor modalities will be described. Specifically, the model of FIGS. 6-7 is an aggregate model, including a first model 600 of FIG. 6 to generate painted annotations for a synthetic image based on data from one or more additional sensor modalities, and a second model 700 of FIG. 7 to conduct motion prediction and/or planning based on the output of the first model 600.

In contrast to the model 500 of FIG. 5, the aggregate model of FIGS. 6-7 can provide for intermediary representation of data from additional sensor modalities as annotations "painted" onto a synthetic image. In this context, "painting" refers to the addition of metadata to a synthetic image indicating attributes of objects within that image. For example, the metadata may indicate that a vehicle has a turn signal or brake light on, that a pedestrian has adopted a specific posture or is facing a certain direction, etc. Rather than providing a raw camera image for processing these painted annotations can be combined with the synthetic image for processing by a network in order to generate an output. For example, where a BEV synthetic image is represented as a set of channels, the annotations may be represented as additional channels for each potential feature (e.g., brake lights, signaling lights, pedestrian posture, pedestrian facing direction, etc.).

To produce painted annotations, a synthetic image 502 and raw image of a camera 504 are fed through respective neural networks, $CNN_S$ and $CNN_C$, as in FIG. 5. In one embodiment, the respective neural networks may be identical to those of FIG. 5. In another embodiment, attributes of the networks may differ according to the function of the networks to produce painted annotations. For example, hyperparameters of the networks may differ when used to produce painted annotations.

As in FIG. 5, the respective networks produce a set of features: specifically, the synthetic image 502 is transformed into a set of synthetic image features 506 and the camera raw image 504 is transformed into a set of raw image features 508. Features 506 and 508 can then be concatenated. However, unlike FIG. 5, the concatenated data is then fed through a decoder that produces a combined image 602, combining the synthetic image 502 with a set of painted annotations learned based on the concatenated data. (While not explicitly shown in FIG. 6, the synthetic image 502 may also be fed to the decoder, in a manner similar to a U-net architecture.)

The model 600 of FIG. 6 may be trained based on a set of manually generated painted annotations. For example, a human may annotate a set of synthetic images 502 based on corresponding raw images 504 to result in manually created combined images 602. Thereafter, the model 600 may be trained to create combined images 602 corresponding to the manually created combined images 602 from the set of synthetic images 502 and corresponding raw images 504. During inference, the model 600 may thus produce new combined images 602 based on new synthetic and raw image features 506 and 508. While a single model is shown in FIG. 6, in some embodiments multiple instances of the model 600 may be created. For example, each instance may generate annotations of a specific type (e.g., turn signals, brake lights, pedestrian pose, etc.), and the annotations of each model may be combined into a combined image 602 with multiple types of annotation.

The combined images 602 produced by the model 600, which fuse a synthetic image 502 and raw images of a camera 504, may then be used as an input to a second machine learning model 700. Specifically, as shown in FIG. 7, the combined images 602 may be fed through a convolutional neural network to generate a set of image features 704. The image features 704 may then be concatenated with state information 510 and fed into a generator and dense layers to result in a trajectory set 512 and mode probabilities 514, in a manner similar to generation of the trajectory set 512 and mode probabilities 514 in FIG. 5. As noted above with respect to FIG. 5, the set 512 and probabilities 514 in combination can indicate an output of the model 700, which can represent for example a predicted motion of an object, a planned action of a vehicle, or a combination thereof. The model 700 may be trained similarly to the model 500 of FIG. 5, as modified to reflect input of the combined image 602 rather than the synthetic and raw images 502 and 504. During inference, the models 600 and 700 may be implemented in conjunction, as an aggregate machine learning model, for purposes of planning or motion prediction. For example, new (e.g., not previously included in a training data set) synthetic images 502 and raw images 504 may be fed into the model 600 to produced combined images 602, which may in turn be fed into the model 700 to produce a predicted motion or planned action.

Accordingly, the models 600 and 700 can provide an output similar to the model 500 of FIG. 5, enabling a vehicle to utilize contextual information from additional sensor modalities that might otherwise be lost in generating a synthetic image 502. However, whereas FIG. 5 produced an output from a concatenation of a synthetic image and raw image data, FIGS. 6-7 provide for separate creation of painted annotations, which may enable the aggregate model to more specifically target certain signals, as controlled for example by training of the model 600. For example, the model 600 may be specifically trained to recognize certain signals, such as brake lights, turn signals, etc., which may not be recognized during the more general training of the model 500.

With reference to FIGS. 8-9, yet another embodiment of a machine learning model fusing an output of a perception system with data from additional sensor modalities will be described. Specifically, FIG. 8 depicts a pre-processing pipeline 800 how information from a BEV synthetic image 502 may be used to pre-process data from an additional sensor modality, such as a camera image 504, prior to use in a machine learning model. FIG. 9 depicts how such preprocessing may be incorporated into a model 900 to learn annotations in conjunction with a desired output, such as motion prediction or planning.

With reference to FIG. 8, the pre-processing pipeline 800 shown enables data from an additional sensor modality, such as a camera image 504, to be pre-processed to reduce the amount of information that must be processed in connection with the data, which may both increase speed of training a model (e.g., by reducing data to be processed) and accuracy of that model (e.g., by focusing on relevant data within a greater set of data). Specifically, while the description above related to a raw camera image depicting an object, it may be that most or all information relative to that object is contained within a specific portion of the image. For example, a camera image capturing another vehicle may also capture a variety of objects other than the other vehicle. The portion of the image capturing these other objects may not be relevant to signals provided by the vehicle, and in fact may inhibit a machine learning model from learning such signals regarding the vehicle. For example, the portion of the image depicting other objects may inhibit a machine learning model from detecting whether a specific vehicle has its brake lights illuminated, a turn signal on, etc.

Accordingly, in some embodiments, a synthetic image 502—or data from a perception system, such as perception system 402—may be used to crop a raw camera image 504 to produce cropped images 802, which cropped images may be used in place of the image 504 for machine learning applications. For example, the synthetic image 502 or other data from a perception system may identify locations of objects depicted in raw camera images 504. These locations may thus be projected on to the raw camera image 504 to locate the object within the raw camera image 504, and produced a cropped image isolated the object from within the raw camera image. When training a model to perform motion prediction with respect to an object, a cropped image of the object may be used as input to the model, rather than a full image of a camera that otherwise depicts the object. Similarly, when training a model to perform action planning of an autonomous vehicle, a set of cropped images for each object in the vicinity of the vehicle may be used, rather than full images from each relevant camera.

To produce cropped images 802, the information contained within the synthetic image 502 maybe projected onto the camera image 504. For example, where a synthetic image 502 indicates that a particular object is positioned relative to a vehicle at a certain position, that position may be projected onto the camera image 504 as the expected location of the particular object. The image 504 may then be cropped to contain that position (e.g., including a buffer around the position), resulting in cropped image 802. Accordingly, the cropped image 802 may represent a portion of the raw camera image 504 that contains the relevant object.

Thereafter, cropped images 802 may be used in place of raw images 504 in the machine learning models disclosed herein. For example, the cropped images may be passed through a convolutional neural network, denoted as $CNN_R$ in FIG. 8, to produce a set of learned features 806 for the cropped images 802, which may then be used to produce painted annotations 810 to the BEV image 502.

One example machine learning model architecture utilizing the cropping of FIG. 8 is shown in FIG. 9, which depicts a model 900 to learn annotations in conjunction with a desired output, such as motion prediction or planning. As shown in FIG. 9, the model 900 takes as input cropped images 802, which may be created as discussed in FIG. 8. The cropped images 802 may be passed through a CNN, denoted in FIG. 9 as $CNN_R$, to produce learned features 806 for the cropped images 802. These learned features 806 can then be passed through distinct dense networks to result in signal probabilities 902 and reduced features 904, respectively. In FIG. 9, the signal probabilities 902 illustratively represent probabilities of various learned signals existing within the cropped images 802. As discussed below, the probabilities 902 of these learned signals may be used in conjunction with trajectory mode probabilities 514 to train the model 900.

The reduced features 904 can then be used to conduct feature painting of a synthetic image 502 to result in a combined image 602. Feature painting may occur similarly to as discussed above with respect to FIG. 6, such as by passing the reduced features 904 and the synthetic image 502 through a decoder to generate the combined image 602. While the combined image 602 is shown in FIG. 9 as being produced based on the synthetic image 502 and the reduced features 904, in some instances the combined image 602 can be produced based on the synthetic image 502 and the learned features 806, thus omitting the dense network between learned features 806 and the reduced features 904.

Thereafter, the combined image 602 may be used, along with state information 510, to produce a trajectory set and trajectory mode probabilities 514, in a similar manner to as discussed above with respect to FIG. 7.

In FIG. 9, relevant features of cropped images 802 may be learned during training of the model 900 by establishing a loss function for the network that combines signal probabilities 902, as learned from the cropped images 802, with mode probabilities 514. For example, the loss of the model 900 may be equal to the loss of the mode probabilities 514 plus the sum of losses for each signal within the signal probabilities 902 (e.g., where each loss is calculated as cross entropy loss). In some instances, the sum of losses for each signal may be weighted by a tunable hyperparameter. In another embodiment, the loss function may be based on mode probabilities 514 independent of signal probabilities 514.

Accordingly, the model 900 may be trained to learn features within data of additional sensor modalities, and to conduct motion prediction or vehicle planning based on those learned features. Thus, the output of the model 900 may be similar to the model 700 of FIG. 7, without relying on manual annotation of synthetic images 502. This may enable the model 900 to capture signals that would otherwise not be captured during manual annotation, thereby increasing overall accuracy of the model 900.

Figure 10:
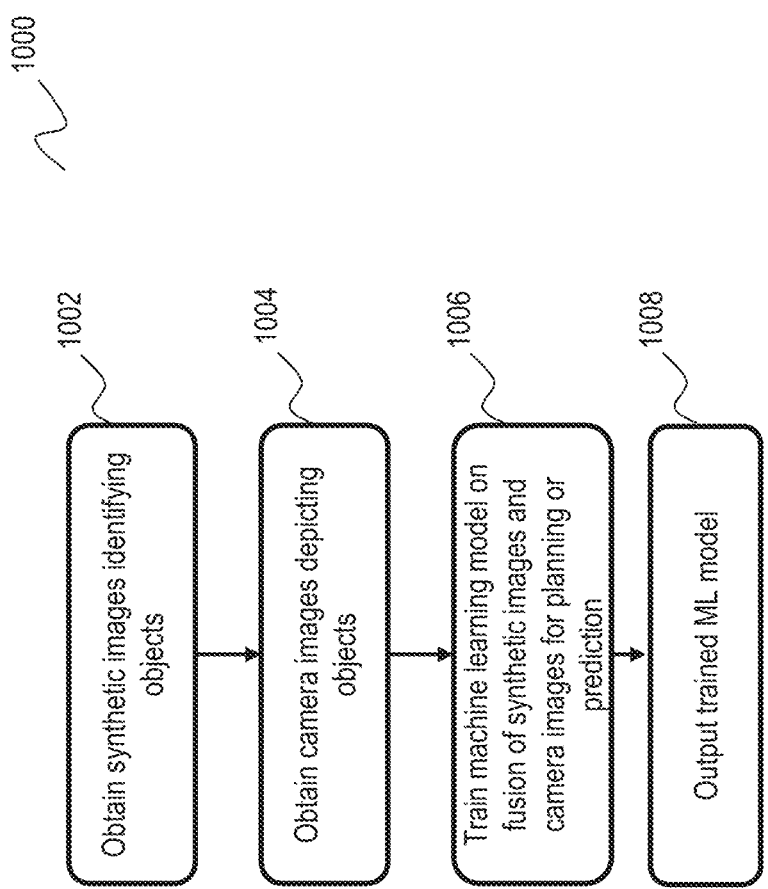
FIG. 10 depicts an example routine for training a machine learning model to fuse output of a perception system with data of additional sensor modalities.
Figure 11:
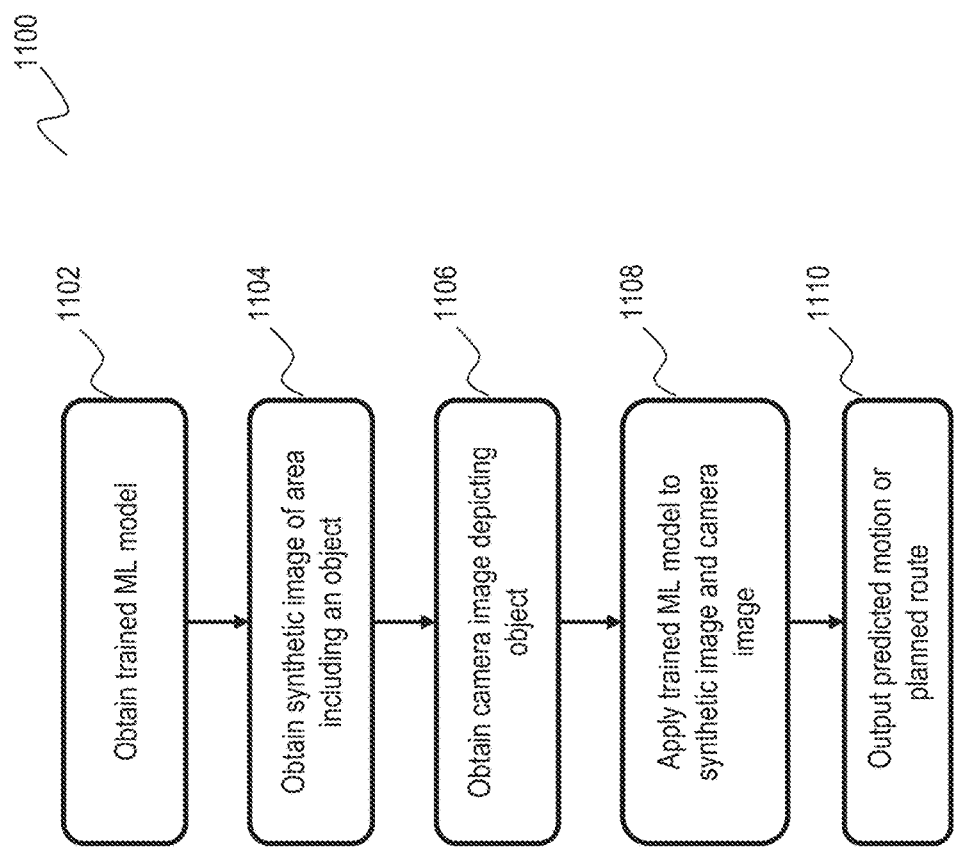
FIG. 11 depicts a routine for utilizing a trained machine learning model to predict object motion or plan actions of a vehicle.

Referring now to FIGS. 10 and 11, illustrated are flow-chart of processes for fusing output of a perception system with data of additional sensor modalities for purposes such as motion prediction and planning. Specifically, FIG. 10 depicts a routine 1000 for training a machine learning model to fuse output of a perception system with data of additional sensor modalities, while FIG. 11 depicts a routine 1100 for utilizing a trained machine learning model to predict object motion or plan actions of a vehicle. The routines 1000 and 1100 may be implemented, for example, by a device 300. Illustratively, the routines 1000 and 1100 may be implemented by a device 300 included within an autonomous vehicle 200. In some cases, the routine 1000 may be implemented by a device 300 external to an autonomous vehicle 200, such as a fleet management system 116, and a trained model produced via the routine 1000 may then be loaded onto a device 300 of an autonomous vehicle 200 for use during operation of the vehicle 200.

The routine 1000 begins at block 1002, where the device 300 obtains synthetic images identifying objects within an environment of a vehicle. For example, the images may be BEV images of an area generated based on sensor data of a vehicle in the area. Objects identified may include any object sensed by the vehicle, such as other motor vehicles, non-motorized vehicles such as bicycles, or pedestrians. The images may be generated, for example, based on a perception system of the vehicle, such as perception system 402. In one embodiment, the perception system 402 generates the synthetic images based on lidar data indicating that objects are in the area.

Additionally, at block 1004, the device 300 obtains camera images depicting the objects in the synthetic images. For example, the images may be of a camera pointed in the direction of the object from a point of view of the vehicle. In one embodiment, the synthetic and camera images are arranged in data pairs, with each pair including first data corresponding to the synthetic image and second data corresponding to the camera image taken concurrently with sensor data used to generate the synthetic image. For example, the data pairs may be collected during operation of one or more test vehicles under operation of a skilled human operator. While FIG. 10 discusses camera images as an example of data of an additional sensor modality, other additional sensor modalities may additionally or alternatively be used.

Thereafter, at block 1006, the device 300 trains a machine learning model based on a fusion of the synthetic and camera images, for purposes of planning or prediction. The model trained may correspond to the models described above with reference to FIGS. 5-9. For example, the model may include a first convolutional neural network to process the first data of the given data pair, a second convolutional neural network to process the second data of the given data pair, and a dense layer to generate the predicted motion of the object corresponding to the given data pair, as discussed e.g., with respect to FIG. 5. As discussed above, the model may take as input additional information, such as state information of one or more objects identified within a synthetic image (e.g., as captured concurrently with data used to generate the synthetic image). For example, the model may take as input state information including speed, acceleration, or pose of the object. As another example, the model may include a convolutional neural network is that takes as input first data corresponding to the synthetic image of the given data pair, as annotated according to the second data corresponding to the camera image of the given data pair. Annotations may include any metadata regarding objects, such as illuminated brake lights, an illuminated turn signal, a wheel position, a limb position, a joint position, etc. Annotation may occur, for example, based on application of a second machine learning model, such as the model 600 of FIG. 6. Alternatively, the annotation may occur based on application of another convolutional neural network, producing the annotations, which other neural network is trained simultaneously to the first convolutional neural network (e.g., as discussed with respect FIG. 9). As discussed above, the machine learning model may in some instances accept camera data as raw images. Additionally or alternatively, the model may accept cropped camera data, such as by projecting the object indicated within the synthetic image into the raw camera data and cropping the raw camera data around the object to produced cropped camera data.

As noted above, the machine learning model may be trained for purposes such as object motion prediction or vehicle action planning. For example, where the model is trained based on observed motion of objects captured within data pairs, the model may be transmitted to a destination vehicle for use in predicting the motion of additional objects sensed by the vehicle. Where the model is trained based on observed actions of a skilled human operator, the model may be transmitted to a destination vehicle for use in planning autonomous actions of the destination vehicle. In some instances, the routine 1000 may be implemented multiple times to generate multiple machine learning models, such as a first model used for object motion prediction and a second model used for action planning.

As noted above, FIG. 11 depicts a routine 1100 for utilizing a trained machine learning model to predict object motion or plan actions of a vehicle, which routine 1100 may be implemented for example within the vehicle 200.

The routine 1100 begins at block 1102, where the vehicle 200 obtains a trained machine learning model, such as a model produced via the routine 1000 of FIG. 10. As discussed with respect to FIG. 10, the model may be trained for a specific purpose, such as object motion detection or action planning.

Thereafter, at blocks 1104 and 1106, the vehicle 200 obtains input data to the trained model. Specifically, at block 1104, the vehicle 200 obtains a synthetic image of an area of the vehicle, which image identifies an object in the area of the vehicle (such as another vehicle, a pedestrian, etc.). Additionally, at block 1106, the vehicle 200 obtains a camera image depicting the object, which may be captured for example by a camera of the vehicle 200 pointed in a direction of the object. The synthetic and camera images may be captured in a manner the same as or similar to capture of the data pairs used to train the machine learning model. For example, the vehicle 200 may be the same or of a similar configuration to vehicles that captured data used to train the model.

In some embodiments, the trained model may use additional information as input, such as state information of an object or state information of the vehicle. Accordingly, such state information may also be obtained at the vehicle, in a similar manner to how such state information was obtained for purposes of training the model.

Thereafter, at block 1108, the trained machine learning model is applied to the synthetic and camera images (and potentially additional inputs, such as state information). For example, the images may be passed through one or more trained convolutional neural networks and/or dense layers to produce a set of trajectory mode probabilities indicating predicted motion of an object or a planned trajectory of the vehicle. Accordingly, the model may output the predicted motion or planned route at block 1110. The output may then be used to control subsequent operation of the vehicle. For example, the predicted motion of an object or planned route may be used as an input to a planning system (e.g., planning system 404) to control subsequent movement of the vehicle.

As discussed above, because the data of additional sensor modalities can capture contextual information that is not otherwise contained within a synthetic image, such as the presence of lights, sounds, poses, etc., and because such data is captured within the trained model of the routine 1100, the predicted motion or planned routes may have higher accuracy than alternative predictions or planned routes. For example, the routine 1100 may enable a vehicle 200 to more accurately predict braking of another vehicle due to presence of brake lights, a lane change of another vehicle due to presence of turn signals, motion of a pedestrian into a crosswalk based on pose or direction faced, etc. Similarly, the routine 1100 may enable a vehicle 200 to more accurately mimic actions of a skilled human operator, given that such an operator may take into account signals such as those noted above. Thus, the routine 1100 may provide for safer and more accurate autonomous vehicles.

In the foregoing description, aspects and embodiments of the present disclosure have been described with reference to numerous specific details that can vary from implementation to implementation. Accordingly, the description and drawings are to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

What is claimed is:

1. A computer system comprising:
   one or more computer readable storage devices configured to store computer executable instructions; and
   one or more computer processors configured to execute the computer executable instructions, wherein execution of the computer executable instructions causes the computer system to:
   obtain a set of data pairs, each data pair comprising:
      first data corresponding to a synthetic image representing a birds-eye-view of an area generated based on sensor data of a vehicle in the area, wherein the synthetic image identifies an object in the area; and
      second data corresponding a camera image representing a viewpoint of the vehicle in the area, wherein the camera image depicts the object;
   train a machine learning model based on the set of data pairs to result in a trained model, wherein the machine learning model includes:
      a first portion trained to:
         generate a set of annotations based on a set of synthetic image features extracted from first data of a data pair, and a set of raw image features extracted from second data of a data pair, and
         fuse the first data and the set of annotations to generate a combined image, and
      a second portion trained to:
         generate a predicted motion of the object, based on the combined image and a set of input state information; and
   transmit the trained model to a destination vehicle, wherein the destination vehicle is configured to apply the trained model to sensor data of the destination vehicle to predict motion of a target object identified within the sensor data.

2. The computer system of claim 1, wherein the machine learning model further includes a dense layer.

3. The computer system of claim 1, wherein the set of input state information comprises one or more of a speed of the object corresponding to the data pair, an acceleration of the object corresponding to the data pair, or a pose of the object corresponding to the data pair.

4. The computer system of claim 1, wherein the set of annotations includes an indication on the object of the data pair at least one of illuminated brake lights, an illuminated turn signal, a wheel position, a limb position, or a joint position.

5. The computer system of claim 1, wherein the first portion is trained simultaneously to the second portion during training of the machine learning model.

6. The computer system of claim 1, wherein the first portion outputs to a dense layer that provides signal probabilities, and wherein the second portion is trained with a loss function that takes as input the signal probabilities and outputs the predicted motion of the object corresponding to the data pair.

7. The computer system of claim 1, wherein the first portion accepts as input a cropped portion of the second data of the data pair, the cropped portion selected according to a position of the object corresponding to the data pair within the second data of the data pair, the position within the second data of the data pair indicated by a position of the object corresponding to the data pair within the first data of the data pair.

8. The computer system of claim 1, wherein execution of the computer executable instructions further causes the computer system to:
   train a second machine learning model based on the set of data pairs to result in a second trained model, wherein the second machine learning model includes at least one convolutional neural network to process the set of data pairs, and wherein the second machine learning model accepts as input a given data pair of the set of data pairs and provides as output a planned motion of the vehicle corresponding to the given data pair; and
   transmit the second trained model to a destination vehicle, wherein the destination vehicle is configured to apply the second trained model to sensor data of the destination vehicle to plan motion of the destination vehicle.

9. The computer system of claim 1, wherein the object within each data pair of the set of data pairs is at least one of a pedestrian, a motor vehicle, or a bicycle.

10. The computer system of claim 1, wherein sensor data of the vehicle used to generate the synthetic image comprises at least one of lidar data associated with a point cloud or radar data associated with a radar image.

11. A computer-implemented method comprising:
   obtaining a set of data pairs, each data pair comprising:
      first data corresponding to a synthetic image representing a birds-eye-view of an area generated based on sensor data of a vehicle in the area, wherein the synthetic image identifies an object in the area; and
      second data corresponding a camera image representing a viewpoint of the vehicle in the area, wherein the camera image depicts the object;

training a machine learning model based on the set of data pairs to result in a trained model, wherein the machine learning model includes: a first portion trained to:
generate a set of annotations based on a set of synthetic image features extracted from first data of a data pair, and a set of raw image features extracted from second data of a data pair, and
fuse the first data and the set of annotations to generate a combined image, and
a second portion trained to:
generate a predicted motion of the object, based on the combined image and a set of input state information; and
transmitting the trained model to a destination vehicle, wherein the destination vehicle is configured to apply the trained model to sensor data of the destination vehicle to predict motion of a target object identified within the sensor data.

12. The computer-implemented method of claim 11 further comprising:
training a second machine learning model based on the set of data pairs to result in a second trained model, wherein the second machine learning model includes at least one convolutional neural network to process the set of data pairs, and wherein the second machine learning model accepts as input a given data pair of the set of data pairs and provides as output a planned motion of the vehicle corresponding to the given data pair; and
transmitting the second trained model to a destination vehicle, wherein the destination vehicle is configured to apply the second trained model to sensor data of the destination vehicle to plan motion of the destination vehicle.

13. One or more non-transitory computer-readable media comprising computer-executable instructions that, when executed by a computing system comprising a processor, cause the computing system to:
obtain a set of data pairs, each data pair comprising:
first data corresponding to a synthetic image representing a birds-eye-view of an area generated based on sensor data of a vehicle in the area, wherein the synthetic image identifies an object in the area; and
second data corresponding a camera image representing a viewpoint of the vehicle in the area, wherein the camera image depicts the object;
train a machine learning model based on the set of data pairs to result in a trained model, wherein the machine learning model includes: a first portion trained to:
generate a set of annotations based on a set of synthetic image features extracted from first data of a data pair, and a set of raw image features extracted from second data of a data pair, and
fuse the first data and the set of annotations to generate a combined image, and
a second portion trained to:
generate a predicted motion of the object, based on the combined image and a set of input state information; and
transmit the trained model to a destination vehicle, wherein the destination vehicle is configured to apply the trained model to sensor data of the destination vehicle to predict motion of a target object identified within the sensor data.

14. The one or more non-transitory computer-readable media of claim 13, wherein the computer-executable instructions further cause the computing system to:
train a second machine learning model based on the set of data pairs to result in a second trained model, wherein the second machine learning model includes at least one convolutional neural network to process the set of data pairs, and wherein the second machine learning model accepts as input a given data pair of the set of data pairs and provides as output a planned motion of the vehicle corresponding to the given data pair; and
transmit the second trained model to a destination vehicle, wherein the destination vehicle is configured to apply the second trained model to sensor data of the destination vehicle to plan motion of the destination vehicle.

15. The one or more non-transitory computer-readable media of claim 13, wherein the machine learning model further includes a dense layer.

16. The one or more non-transitory computer-readable media of claim 13, wherein the set of input state information comprises one or more of a speed of the object corresponding to the data pair, an acceleration of the object corresponding to the data pair, or a pose of the object corresponding to the data pair.

17. The one or more non-transitory computer-readable media of claim 13, wherein the set of annotations includes an indication on the object of the data pair at least one of illuminated brake lights, an illuminated turn signal, a wheel position, a limb position, or a joint position.

18. The one or more non-transitory computer-readable media of claim 13, wherein the first portion is trained simultaneously to the second portion during training of the machine learning model.

19. The one or more non-transitory computer-readable media of claim 13, wherein the first portion outputs to a dense layer that provides signal probabilities, and wherein the second portion is trained with a loss function that takes as input the signal probabilities and outputs the predicted motion of the object corresponding to the data pair.

20. The one or more non-transitory computer-readable media of claim 13, wherein the first portion accepts as input a cropped portion of the second data of the data pair, the cropped portion selected according to a position of the object corresponding to the data pair within the second data of the data pair, the position within the second data of the data pair indicated by a position of the object corresponding to the data pair within the first data of the data pair.

* * * * *